(12) United States Patent
Horowitz et al.

(10) Patent No.: US 10,740,355 B2
(45) Date of Patent: *Aug. 11, 2020

(54) SYSTEM AND METHOD FOR OPTIMIZING DATA MIGRATION IN A PARTITIONED DATABASE

(71) Applicant: MongoDB, Inc., New York, NY (US)

(72) Inventors: Eliot Horowitz, New York, NY (US); Dwight Merriman, New York, NY (US)

(73) Assignee: MongoDB, Inc., New York, NY (US)

(*) Notice: Subject to any disclaimer, the term of this patent is extended or adjusted under 35 U.S.C. 154(b) by 284 days.

This patent is subject to a terminal disclaimer.

(21) Appl. No.: 15/654,590

(22) Filed: Jul. 19, 2017

(65) Prior Publication Data

US 2017/0322996 A1    Nov. 9, 2017

Related U.S. Application Data

(63) Continuation of application No. 13/078,104, filed on Apr. 1, 2011, now Pat. No. 9,740,762.

(51) Int. Cl.
*G06F 17/00* (2019.01)
*G06F 16/27* (2019.01)

(52) U.S. Cl.
CPC ................... *G06F 16/278* (2019.01)

(58) Field of Classification Search
CPC ...... G06F 16/278; G06F 16/27; G06F 16/951; G06F 16/21; G06F 16/24554; G06F 16/29
See application file for complete search history.

(56) References Cited

U.S. PATENT DOCUMENTS

| | | |
|---|---|---|
| 4,918,593 A | 4/1990 | Huber |
| 5,379,419 A | 1/1995 | Heffernan et al. |
| 5,416,917 A | 5/1995 | Adair et al. |

(Continued)

OTHER PUBLICATIONS

[No Author Listed], Automated Administration Tasks (SQL Server Agent). https://docs.microsoft.com/en-us/sql/ssms/agent/automated-adminsitration-tasks-sql-server-agent. 2 pages. [downloaded Mar. 4, 2017].

(Continued)

*Primary Examiner* — Truong V Vo
(74) *Attorney, Agent, or Firm* — Wolf, Greenfield & Sacks, P.C.

(57) ABSTRACT

According to one aspect, provided is a horizontally scaled database architecture. Partition a database enables efficient distribution of data across a number of systems reducing processing costs associated with multiple machines. According to some aspects, the partitioned database can be managed as a single source interface to handle client requests. Further, it is realized that by identifying and testing key properties, horizontal scaling architectures can be implemented and operated with minimal overhead. In one embodiment, databases can be partitioned in an order preserving manner such that the overhead associated with moving the data for a given partition can be minimized during management of the data and/or database. In one embodiment, splits and migrations operations prioritize zero cost partitions, thereby, reducing computational burden associated with managing a partitioned database.

19 Claims, 9 Drawing Sheets

(56) References Cited

U.S. PATENT DOCUMENTS

| | | |
|---|---|---|
| 5,471,629 A | 11/1995 | Risch |
| 5,551,027 A | 8/1996 | Choy et al. |
| 5,598,559 A | 1/1997 | Chaudhuri |
| 5,710,915 A | 1/1998 | McElhiney |
| 5,884,299 A | 3/1999 | Ramesh et al. |
| 5,999,179 A | 12/1999 | Kekic et al. |
| 6,065,017 A | 5/2000 | Barker |
| 6,088,524 A | 7/2000 | Levy et al. |
| 6,112,201 A | 8/2000 | Wical |
| 6,115,705 A | 9/2000 | Larson |
| 6,240,406 B1 | 5/2001 | Tannen |
| 6,240,514 B1 | 5/2001 | Inoue et al. |
| 6,249,866 B1 | 6/2001 | Brundrett et al. |
| 6,324,540 B1 | 11/2001 | Khanna et al. |
| 6,324,654 B1 | 11/2001 | Wahl et al. |
| 6,339,770 B1 | 1/2002 | Leung et al. |
| 6,351,742 B1 | 2/2002 | Agarwal et al. |
| 6,363,389 B1 | 3/2002 | Lyle et al. |
| 6,385,201 B1 | 5/2002 | Iwata |
| 6,385,604 B1 | 5/2002 | Bakalash et al. |
| 6,496,843 B1 | 12/2002 | Getchius et al. |
| 6,505,187 B1 | 1/2003 | Shatdal |
| 6,611,850 B1 | 8/2003 | Shen |
| 6,687,846 B1 | 2/2004 | Adrangi et al. |
| 6,691,101 B2 | 2/2004 | MacNicol et al. |
| 6,801,905 B2 | 10/2004 | Andrei |
| 6,823,474 B2 | 11/2004 | Kampe et al. |
| 6,920,460 B1 | 7/2005 | Srinivasan et al. |
| 6,959,369 B1 | 10/2005 | Ashton et al. |
| 7,020,649 B2 | 3/2006 | Cochrane et al. |
| 7,032,089 B1 | 4/2006 | Ranade et al. |
| 7,082,473 B2 | 7/2006 | Breitbart et al. |
| 7,177,866 B2 | 2/2007 | Holenstein et al. |
| 7,181,460 B2 | 2/2007 | Coss et al. |
| 7,191,299 B1 | 3/2007 | Kekre et al. |
| 7,246,345 B1 | 7/2007 | Sharma et al. |
| 7,447,807 B1 | 11/2008 | Merry et al. |
| 7,467,103 B1 | 12/2008 | Murray et al. |
| 7,469,253 B2 | 12/2008 | Celis et al. |
| 7,472,117 B2 | 12/2008 | Dettinger et al. |
| 7,486,661 B2 | 2/2009 | Van den Boeck et al. |
| 7,548,928 B1 | 6/2009 | Dean et al. |
| 7,552,356 B1 | 6/2009 | Waterhouse et al. |
| 7,558,481 B2 | 7/2009 | Jenkins et al. |
| 7,567,991 B2 | 7/2009 | Armangau et al. |
| 7,617,369 B1 | 11/2009 | Bezbaruah et al. |
| 7,634,459 B1 | 12/2009 | Eshet et al. |
| 7,647,329 B1 | 1/2010 | Fischman et al. |
| 7,657,570 B2 | 2/2010 | Wang et al. |
| 7,657,578 B1 | 2/2010 | Karr et al. |
| 7,668,801 B1 | 2/2010 | Koudas et al. |
| 7,761,465 B1 | 7/2010 | Nonaka et al. |
| 7,957,284 B2 | 6/2011 | Lu et al. |
| 7,962,458 B2 | 6/2011 | Holenstein et al. |
| 8,005,804 B2 | 8/2011 | Greer |
| 8,005,868 B2 | 8/2011 | Saborit et al. |
| 8,037,059 B2 | 10/2011 | Bestgen et al. |
| 8,078,825 B2 | 12/2011 | Oreland et al. |
| 8,082,265 B2 | 12/2011 | Carlson et al. |
| 8,086,597 B2 | 12/2011 | Balmin et al. |
| 8,099,572 B1 | 1/2012 | Arora et al. |
| 8,103,906 B1 | 1/2012 | Alibakhsh et al. |
| 8,108,443 B2 | 1/2012 | Thusoo |
| 8,126,848 B2 | 2/2012 | Wagner |
| 8,170,984 B2 | 5/2012 | Bakalash et al. |
| 8,260,840 B1 | 9/2012 | Sirota et al. |
| 8,296,419 B1 | 10/2012 | Khanna et al. |
| 8,305,999 B2 | 11/2012 | Palanki et al. |
| 8,321,558 B1 | 11/2012 | Sirota et al. |
| 8,352,450 B1 | 1/2013 | Mraz et al. |
| 8,352,463 B2 | 1/2013 | Nayak |
| 8,363,961 B1 | 1/2013 | Avidan et al. |
| 8,370,857 B2 | 2/2013 | Kamii et al. |
| 8,386,463 B2 | 2/2013 | Bestgen et al. |
| 8,392,482 B1 | 3/2013 | McAlister et al. |
| 8,539,197 B1 | 9/2013 | Marshall et al. |
| 8,572,031 B2 | 10/2013 | Merriman et al. |
| 8,589,382 B2 | 11/2013 | Betawadkar-Norwood |
| 8,589,574 B1 | 11/2013 | Cormie et al. |
| 8,615,507 B2 | 12/2013 | Varadarajulu et al. |
| 8,712,044 B2 | 4/2014 | MacMillan et al. |
| 8,712,993 B1 | 4/2014 | Ordonez |
| 8,751,533 B1 | 6/2014 | Dhavale et al. |
| 8,843,441 B1 | 9/2014 | Rath et al. |
| 8,869,256 B2 | 10/2014 | Sample |
| 8,996,463 B2 | 3/2015 | Merriman et al. |
| 9,015,431 B2 | 4/2015 | Resch et al. |
| 9,069,827 B1 | 6/2015 | Rath et al. |
| 9,116,862 B1 | 8/2015 | Rath et al. |
| 9,141,814 B1 | 9/2015 | Murray |
| 9,183,254 B1 | 11/2015 | Cole et al. |
| 9,262,462 B2 | 2/2016 | Merriman et al. |
| 9,268,639 B2 | 2/2016 | Leggette et al. |
| 9,274,902 B1 | 3/2016 | Morley et al. |
| 9,317,576 B2 | 4/2016 | Merriman et al. |
| 9,350,633 B2 | 5/2016 | Cudak et al. |
| 9,350,681 B1 | 5/2016 | Kitagawa et al. |
| 9,460,008 B1 | 10/2016 | Leshinsky et al. |
| 9,495,427 B2 | 11/2016 | Abadi et al. |
| 9,569,481 B1 | 2/2017 | Chandra et al. |
| 9,660,666 B1 | 5/2017 | Ciarlini et al. |
| 9,740,762 B2 | 8/2017 | Horowitz et al. |
| 9,792,322 B2 | 10/2017 | Merriman et al. |
| 9,805,108 B2 | 10/2017 | Merriman et al. |
| 9,881,034 B2 | 1/2018 | Horowitz et al. |
| 9,959,308 B1 | 5/2018 | Carman et al. |
| 10,031,931 B2 | 7/2018 | Horowitz et al. |
| 10,031,956 B2 | 7/2018 | Merriman et al. |
| 10,262,050 B2 | 4/2019 | Bostic et al. |
| 10,346,430 B2 | 7/2019 | Horowitz et al. |
| 10,346,434 B1 | 7/2019 | Morkel et al. |
| 10,366,100 B2 | 7/2019 | Horowitz et al. |
| 10,372,926 B1 | 8/2019 | Leshinsky et al. |
| 10,394,822 B2 | 8/2019 | Stearn |
| 10,423,626 B2 | 9/2019 | Stearn et al. |
| 10,430,433 B2 | 10/2019 | Stearn et al. |
| 10,489,357 B2 | 11/2019 | Horowitz et al. |
| 10,496,669 B2 | 12/2019 | Merriman et al. |
| 2001/0021929 A1 | 9/2001 | Lin et al. |
| 2002/0029207 A1 | 3/2002 | Bakalash et al. |
| 2002/0065675 A1 | 5/2002 | Grainger et al. |
| 2002/0065676 A1 | 5/2002 | Grainger et al. |
| 2002/0065677 A1 | 5/2002 | Grainger et al. |
| 2002/0143901 A1 | 10/2002 | Lupo et al. |
| 2002/0147842 A1 | 10/2002 | Breitbart et al. |
| 2002/0184239 A1 | 12/2002 | Mosher, Jr. et al. |
| 2003/0046307 A1 | 3/2003 | Rivette et al. |
| 2003/0084073 A1 | 5/2003 | Hotti et al. |
| 2003/0088659 A1 | 5/2003 | Susarla et al. |
| 2003/0182427 A1 | 9/2003 | Halpern |
| 2003/0187864 A1 | 10/2003 | McGoveran |
| 2004/0078569 A1 | 4/2004 | Hotti |
| 2004/0133591 A1 | 7/2004 | Holenstein et al. |
| 2004/0168084 A1 | 8/2004 | Owen et al. |
| 2004/0186817 A1 | 9/2004 | Thames et al. |
| 2004/0186826 A1 | 9/2004 | Choi et al. |
| 2004/0205048 A1 | 10/2004 | Pizzo et al. |
| 2004/0236743 A1 | 11/2004 | Blaicher et al. |
| 2004/0254919 A1 | 12/2004 | Giuseppini |
| 2005/0027796 A1 | 2/2005 | San Andres et al. |
| 2005/0033756 A1 | 2/2005 | Kottomtharayil et al. |
| 2005/0038833 A1 | 2/2005 | Colrain et al. |
| 2005/0192921 A1 | 9/2005 | Chaudhuri et al. |
| 2005/0234841 A1 | 10/2005 | Miao et al. |
| 2005/0283457 A1 | 12/2005 | Sonkin et al. |
| 2006/0004746 A1 | 1/2006 | Angus et al. |
| 2006/0020586 A1 | 1/2006 | Prompt et al. |
| 2006/0085541 A1 | 4/2006 | Cuomo et al. |
| 2006/0090095 A1 | 4/2006 | Massa et al. |
| 2006/0168154 A1 | 7/2006 | Zhang et al. |
| 2006/0209782 A1 | 9/2006 | Miller et al. |
| 2006/0218123 A1 | 9/2006 | Chowdhuri et al. |
| 2006/0235905 A1 | 10/2006 | Kapur |
| 2006/0288232 A1 | 12/2006 | Ho et al. |

(56) References Cited

U.S. PATENT DOCUMENTS

| | | |
|---|---|---|
| 2006/0294129 A1 | 12/2006 | Stanfill et al. |
| 2007/0050436 A1 | 3/2007 | Chen et al. |
| 2007/0061487 A1 | 3/2007 | Moore et al. |
| 2007/0094237 A1 | 4/2007 | Mitchell et al. |
| 2007/0203944 A1 | 8/2007 | Batra et al. |
| 2007/0226640 A1 | 9/2007 | Holbrook et al. |
| 2007/0233746 A1 | 10/2007 | Garbow et al. |
| 2007/0240129 A1 | 10/2007 | Kretzschmar et al. |
| 2008/0002741 A1 | 1/2008 | Maheshwari et al. |
| 2008/0005475 A1 | 1/2008 | Lubbers et al. |
| 2008/0016021 A1 | 1/2008 | Gulbeden et al. |
| 2008/0071755 A1* | 3/2008 | Barsness ............... G06F 16/284 |
| 2008/0098041 A1 | 4/2008 | Chidambaran et al. |
| 2008/0140971 A1 | 6/2008 | Dankel et al. |
| 2008/0162590 A1 | 7/2008 | Kundu et al. |
| 2008/0288646 A1 | 11/2008 | Hasha et al. |
| 2009/0030986 A1 | 1/2009 | Bates |
| 2009/0055350 A1 | 2/2009 | Branish et al. |
| 2009/0077010 A1 | 3/2009 | Muras et al. |
| 2009/0094318 A1 | 4/2009 | Gladwin et al. |
| 2009/0222474 A1 | 9/2009 | Alpern et al. |
| 2009/0240744 A1 | 9/2009 | Thomson et al. |
| 2009/0271412 A1 | 10/2009 | Lacapra et al. |
| 2010/0011026 A1 | 1/2010 | Saha et al. |
| 2010/0030793 A1 | 2/2010 | Cooper et al. |
| 2010/0030800 A1 | 2/2010 | Brodfuehrer et al. |
| 2010/0049717 A1 | 2/2010 | Ryan et al. |
| 2010/0058010 A1 | 3/2010 | Augenstein et al. |
| 2010/0106934 A1 | 4/2010 | Calder et al. |
| 2010/0161492 A1 | 6/2010 | Harvey et al. |
| 2010/0198791 A1 | 8/2010 | Wu et al. |
| 2010/0205028 A1 | 8/2010 | Johnson et al. |
| 2010/0223078 A1 | 9/2010 | Willis et al. |
| 2010/0235606 A1 | 9/2010 | Oreland et al. |
| 2010/0250930 A1 | 9/2010 | Csaszar et al. |
| 2010/0333111 A1 | 12/2010 | Kothamasu |
| 2010/0333116 A1 | 12/2010 | Prahlad et al. |
| 2011/0022642 A1 | 1/2011 | deMilo et al. |
| 2011/0125704 A1 | 5/2011 | Mordinova et al. |
| 2011/0125766 A1* | 5/2011 | Carozza ................. G06F 16/51 707/752 |
| 2011/0125894 A1 | 5/2011 | Anderson et al. |
| 2011/0138148 A1 | 6/2011 | Friedman et al. |
| 2011/0202792 A1 | 8/2011 | Atzmony |
| 2011/0225122 A1 | 9/2011 | Denuit et al. |
| 2011/0225123 A1 | 9/2011 | D'Souza et al. |
| 2011/0231447 A1 | 9/2011 | Starkey |
| 2011/0246717 A1 | 10/2011 | Kobayashi et al. |
| 2011/0307338 A1 | 12/2011 | Carlson |
| 2012/0054155 A1 | 3/2012 | Darcy |
| 2012/0076058 A1 | 3/2012 | Padmanabh et al. |
| 2012/0078848 A1 | 3/2012 | Jennas et al. |
| 2012/0079224 A1 | 3/2012 | Clayton et al. |
| 2012/0084414 A1 | 4/2012 | Brock et al. |
| 2012/0109892 A1 | 5/2012 | Novik et al. |
| 2012/0109935 A1 | 5/2012 | Meijer |
| 2012/0130988 A1 | 5/2012 | Nica et al. |
| 2012/0131278 A1 | 5/2012 | Chang et al. |
| 2012/0136835 A1 | 5/2012 | Kosuru et al. |
| 2012/0138671 A1 | 6/2012 | Gaede et al. |
| 2012/0158655 A1 | 6/2012 | Dove et al. |
| 2012/0159097 A1 | 6/2012 | Jennas, II et al. |
| 2012/0166390 A1 | 6/2012 | Merriman et al. |
| 2012/0166517 A1 | 6/2012 | Lee et al. |
| 2012/0179833 A1 | 7/2012 | Kenrick et al. |
| 2012/0198200 A1 | 8/2012 | Li et al. |
| 2012/0221540 A1 | 8/2012 | Rose et al. |
| 2012/0254175 A1 | 10/2012 | Horowitz |
| 2012/0274664 A1 | 11/2012 | Fagnou |
| 2012/0320914 A1 | 12/2012 | Thyni et al. |
| 2013/0019296 A1 | 1/2013 | Brandenburg |
| 2013/0151477 A1 | 6/2013 | Tsaur et al. |
| 2013/0290249 A1 | 10/2013 | Merriman et al. |
| 2013/0290471 A1 | 10/2013 | Venkatesh |
| 2013/0332484 A1 | 12/2013 | Gajic |
| 2013/0339379 A1 | 12/2013 | Ferrari et al. |
| 2013/0346366 A1 | 12/2013 | Ananthanarayanan et al. |
| 2014/0013334 A1 | 1/2014 | Bisdikian et al. |
| 2014/0032525 A1 | 1/2014 | Merriman et al. |
| 2014/0032579 A1 | 1/2014 | Merriman et al. |
| 2014/0032628 A1 | 1/2014 | Cudak et al. |
| 2014/0074790 A1 | 3/2014 | Berman et al. |
| 2014/0101100 A1 | 4/2014 | Hu et al. |
| 2014/0164831 A1 | 6/2014 | Merriman et al. |
| 2014/0180723 A1 | 6/2014 | Cote et al. |
| 2014/0258343 A1 | 9/2014 | Nikula |
| 2014/0279929 A1 | 9/2014 | Gupta et al. |
| 2014/0280380 A1 | 9/2014 | Jagtap et al. |
| 2015/0012797 A1 | 1/2015 | Leggette et al. |
| 2015/0016300 A1 | 1/2015 | Devireddy et al. |
| 2015/0074041 A1 | 3/2015 | Bhattacharjee et al. |
| 2015/0081766 A1 | 3/2015 | Curtis et al. |
| 2015/0242531 A1 | 8/2015 | Rodniansky |
| 2015/0278295 A1 | 10/2015 | Merriman et al. |
| 2015/0301901 A1 | 10/2015 | Rath et al. |
| 2015/0331755 A1 | 11/2015 | Morgan |
| 2015/0341212 A1 | 11/2015 | Hsiao et al. |
| 2015/0378786 A1 | 12/2015 | Suparna et al. |
| 2016/0005423 A1 | 1/2016 | Neppalli et al. |
| 2016/0048345 A1 | 2/2016 | Vijayrao et al. |
| 2016/0110284 A1 | 4/2016 | Athalye et al. |
| 2016/0110414 A1 | 4/2016 | Park et al. |
| 2016/0162354 A1 | 6/2016 | Singhai et al. |
| 2016/0162374 A1 | 6/2016 | Mutha et al. |
| 2016/0188377 A1 | 6/2016 | Thimmappa et al. |
| 2016/0203202 A1 | 7/2016 | Merriman et al. |
| 2016/0246861 A1 | 8/2016 | Merriman et al. |
| 2016/0306709 A1 | 10/2016 | Shaull |
| 2016/0323378 A1 | 11/2016 | Coskun et al. |
| 2016/0364440 A1 | 12/2016 | Lee et al. |
| 2017/0032007 A1 | 2/2017 | Merriman |
| 2017/0032010 A1 | 2/2017 | Merriman |
| 2017/0091327 A1 | 3/2017 | Bostic et al. |
| 2017/0109398 A1 | 4/2017 | Stearn |
| 2017/0109399 A1 | 4/2017 | Stearn et al. |
| 2017/0109421 A1 | 4/2017 | Stearn et al. |
| 2017/0169059 A1 | 6/2017 | Horowitz et al. |
| 2017/0262516 A1 | 9/2017 | Horowitz et al. |
| 2017/0262517 A1 | 9/2017 | Horowitz et al. |
| 2017/0262519 A1 | 9/2017 | Horowitz et al. |
| 2017/0262638 A1 | 9/2017 | Horowitz et al. |
| 2017/0264432 A1 | 9/2017 | Horowitz et al. |
| 2017/0270176 A1 | 9/2017 | Horowitz et al. |
| 2017/0286510 A1 | 10/2017 | Horowitz et al. |
| 2017/0286516 A1 | 10/2017 | Horowitz et al. |
| 2017/0286517 A1 | 10/2017 | Horowitz et al. |
| 2017/0286518 A1 | 10/2017 | Horowitz et al. |
| 2017/0322954 A1 | 11/2017 | Horowitz et al. |
| 2017/0344290 A1 | 11/2017 | Horowitz et al. |
| 2017/0344441 A1 | 11/2017 | Horowitz et al. |
| 2017/0344618 A1 | 11/2017 | Horowitz et al. |
| 2017/0371750 A1 | 12/2017 | Horowitz et al. |
| 2017/0371968 A1 | 12/2017 | Horowitz et al. |
| 2018/0004804 A1 | 1/2018 | Merriman et al. |
| 2018/0095852 A1 | 4/2018 | Keremane et al. |
| 2018/0096045 A1 | 4/2018 | Merriman et al. |
| 2018/0165338 A1 | 6/2018 | Kumar et al. |
| 2018/0300209 A1 | 10/2018 | Rahut |
| 2018/0300381 A1 | 10/2018 | Horowitz et al. |
| 2018/0300385 A1 | 10/2018 | Merriman et al. |
| 2018/0314750 A1 | 11/2018 | Merriman et al. |
| 2018/0343131 A1 | 11/2018 | George et al. |
| 2018/0365114 A1 | 12/2018 | Horowitz |
| 2019/0102410 A1 | 4/2019 | Horowitz et al. |
| 2019/0303382 A1 | 10/2019 | Bostic et al. |

OTHER PUBLICATIONS

Nelson et al., Automate MongoDB with MMS. PowerPoint Presentation. Published Jul. 24, 2014. 27 slides. http://www.slideshare.net/mongodb/mms-automation-mongo-db-world.

Poder, Oracle living books. 2009. <http://tech.e2sn.com/oracle/sql/oracle-execution-plan-operation-reference >.

(56) References Cited

OTHER PUBLICATIONS

Stirman, Run MongoDB with Confidence using MMS. PowerPoint Presentation. Published Oct. 6, 2014. 34 slides. http://www.slideshare.net/mongodb/mongo-db-boston-run-mongodb-with-mms-20141001.
Walsh et al., Xproc: An XML Pipeline Language. May 11, 2011. <https://www.w3.org/TR/xproc/>.
Wikipedia, Dataflow programming. Oct. 2011. <http://en.wikipedia.org/wiki/Dataflow_programming>.
Wikipedia, Pipeline (Unix). Sep. 2011. <http://en.wikipedia.org/wiki/Pipeline (Unix)>.
U.S. Appl. No. 15/074,987, filed Mar. 18, 2016, Merriman.
U.S. Appl. No. 13/929,109, filed Jun. 27, 2013, Merriman et al.
U.S. Appl. No. 15/200,721, filed Jul. 1, 2016, Merriman.
U.S. Appl. No. 15/200,975, filed Jul. 1, 2016, Merriman.
U.S. Appl. No. 15/605,141, filed May 25, 2017, Horowitz et al.
U.S. Appl. No. 15/605,276, filed May 25, 2017, Horowitz et al.
U.S. Appl. No. 15/605,372, filed May 25, 2017, Horowitz et al.
U.S. Appl. No. 15/605,426, filed May 25, 2017, Horowitz et al.
U.S. Appl. No. 16/294,227, filed Mar. 6, 2019, Bostic et al.
U.S. Appl. No. 16/525,447, filed Jul. 29, 2019, Horowitz et al.
U.S. Appl. No. 16/456,685, filed Jun. 28, 2019, Horowitz et al.
Ongaro et al., In Search of an Understandable Consensus Algorithm. Proceedings of USENIX ATC'14: 2014 USENIX Annual Technical Conference. Philadelphia, PA. Jun. 19-20, 2014; pp. 305-320.
U.S. Appl. No. 15/706,593, filed Sep. 15, 2017, Merriman et al.
U.S. Appl. No. 15/721,176, filed Sep. 29, 2017, Merriman et al.
U.S. Appl. No. 14/992,225, filed Jan. 11, 2016, Bostic et al.
U.S. Appl. No. 16/035,370, filed Jul. 13, 2018, Horowitz et al.
U.S. Appl. No. 15/605,512, filed May 25, 2017, Horowitz et al.
U.S. Appl. No. 15/605,143, filed May 25, 2017, Horowitz.
U.S. Appl. No. 15/605,391, filed May 25, 2017, Horowitz.
U.S. Appl. No. 15/390,345, filed Dec. 23, 2016, Stearn et al.
U.S. Appl. No. 15/390,351, filed Dec. 23, 2016, Stearn et al.
U.S. Appl. No. 15/390,364, filed Dec. 23, 2016, Stearn et al.
U.S. Appl. No. 15/604,879, filed May 25, 2017, Horowitz.
U.S. Appl. No. 15/604,856, filed May 25, 2017, Horowitz et al.
U.S. Appl. No. 15/627,502, filed Jun. 20, 2017, Horowitz et al.
U.S. Appl. No. 15/627,672, filed Jun. 20, 2017, Horowitz et al.
U.S. Appl. No. 16/013,345, filed Jun. 20, 2018, Horowitz.
U.S. Appl. No. 15/627,613, filed Jun. 20, 2017, Horowitz et al.
U.S. Appl. No. 15/627,631, filed Jun. 20, 2017, Horowitz et al.
U.S. Appl. No. 15/627,645, filed Jun. 20, 2017, Horowitz et al.
U.S. Appl. No. 15/627,656, filed Jun. 20, 2017, Horowitz et al.
U.S. Appl. No. 16/013,720, filed Jun. 20, 2018, Horowitz et al.
U.S. Appl. No. 16/013,706, filed Jun. 20, 2018, Merriman et al.
U.S. Appl. No. 16/013,725, filed Jun. 20, 2018, Merriman et al.
Chang et al., Bigtable: a distributed storage system for structured data. OSDI'06: Seventh Symposium on Operating System Design and Implementation. Nov. 2006.
Cooper et al., PNUTS: Yahoo!'s hosted data serving platform. VLDB Endowment. Aug. 2008.
Decandia et al., Dynamo: Amazon's highly available key-value store. SOSP 2007. Oct. 2004.
Van Renesse et al., Chain replication for supporting high throughput and availability. OSDI. 2004: 91-104.
Wilkins et al., Migrate DB2 applications to a partitioned database. developerWorks, IBM. Apr. 24, 2008, 33 pages.

\* cited by examiner

SYSTEM AND METHOD FOR OPTIMIZING DATA MIGRATION IN A PARTITIONED DATABASE

RELATED APPLICATIONS

This application is a continuation of and claims priority under 35 U.S.C. § 120 to U.S. patent application Ser. No. 13/078,104, entitled "SYSTEM AND METHOD FOR OPTIMIZING DATA MIGRATION IN A PARTITIONED DATABASE," filed on Apr. 1, 2011, which application is incorporated herein by reference in its entirety.

BACKGROUND

As databases architectures have grown more and more sophisticated and client demand for services has increased, the need to provide more and more processing power has grown. In conventional systems additional processing power has been achieved through vertical scaling of the systems that implement, for example, database services. An example of vertical scaling typically involves adding more processors in a multiprocessor system, providing additional processing capacity for servicing, for example, client requests. However, such an approach is typically expensive, and as the necessary processing capacity increases, the cost to further increase capacity can grow exponentially.

SUMMARY

According to some aspects, it is realized that horizontal scaling, the additional of computer system, can achieve significant efficiencies for database processing. By partitioning a database across a number of additional systems, database requests can be distributed and data throughput significantly increased based on the number of systems. Incorporating a transparent front end to manage the distribution of database records allows system to leverage low processing costs associated with multiple machines while still providing a single source interface to handle client requests. According to some aspects, it is realized that conventional horizontal scaling architectures can also require burdensome computational overhead in implementation and operation. According to one aspect, horizontal scaling architectures can be implemented and operated with minimal overhead. In one embodiment, a system is configured to identify and test database key properties. For example, a system can optimize database partitioning where the database key used to organize a given collection of data is sequential. In one embodiment, databases can be partitioned in an order preserving manner such that the overhead associated with moving the data for a given partition can be minimized. Such data split and migrations are typically required during normal operation and/or management of a partitioned database. A partitioned database architecture implements divisions within the data of a database so that database operations can be spread over multiple computer systems. In some implementations, a routing process handles request for data access, providing a single interface for interaction with requesting systems. The routing process can direct requests to each system for handling of actual data resident within a given partition.

In one example, database partitions are configured as shards. Each database shard can be accessed as an instantiation of the database for the data within a given partition, for example, by a routing process. The database shard can be configured to handle reads, writes, and updates to the data within the given partition. The term shard can be used to refer to the data within a given partition, as well as a reference to the instantiation of the database for the given partition (e.g. the data and the processes for reading, writing, updating the data, etc.). Each shard of data can be configured to include a contiguous range of the data within a partitioned database. According to one embodiment, shards of data are generated in such a way to minimize overhead associated with maintained sharded data. In one example, network transmission required to migrate sharded data can be reduced by optimizing creation of new shards of data. New shards of data can be created as needed, typically as the size of the database grows.

In some embodiments, a managed database can include a database organized into shards, where for example, some of the sharded data is organized based on a sequential database key and/or sequential database key phrase. For data associated with a sequential key or key pattern, new data (e.g. document, data entity, etc.) can be assigned a new and increasing key value. In some embodiments, new data can be directed to new shards based on the sequential key. Generation of new shard having little or no data requires little overhead. Further migration of these new shards can result in a significant reduction in network traffic. In some instances, a database management system can exploit the ordering of the data contained within a database, or the ordering of subset of the data, to ensure that as new shards are created, little or no records need to be moved from one shard to another.

According to one aspect provided is a system for optimizing data distribution. The system comprises at least one processor operatively connected to a memory for executing system components, a database comprising a plurality of database partitions, wherein at least one of the plurality of database partitions includes a contiguous range of data from the database, and a partition component configured to detect a partition size for the at least one of the plurality of database partitions that exceeds a size threshold, split the at least one of the database partitions into at least a first and a second partition, control a distribution of data within the first and the second partition based on a value for a database key associated with the data in the at least one of the plurality of database partitions, wherein controlling the distribution includes minimizing any data distributed to the second partition based on a maximum value for the database key associated with the data in the at least one of the plurality of database partitions. According to one embodiment, the partition component is further configured to identify a collection comprising a group of database partitions having a sequential database key, and wherein controlling the distribution occurs in response to an identification of the sequential database key.

According to one embodiment, the partition component is further configured to define the first partition having a minimum key value and a maximum key value less than or equal to the maximum key value for the partition's data, define the second partition range to include values greater than or equal to the maximum key value. According to one embodiment, the partition component is further configured to lock the partition for write requests in response to splitting operations. According to one embodiment, the contiguous range comprises a range of one or more key values associated with the database data. According to one embodiment, the database is organized into a plurality of collections, and each collection comprises a plurality of partitions. According to one embodiment, each partition within a collection includes a contiguous range of data from the database, wherein the contiguous range comprises a range of one or more key values associated with the database data.

According to one embodiment, the partition component is further configured to assign at least any data in the at least one of the plurality of database partitions having associated database key values less than the maximum value to the first partition, and assign at least any data in the at least one of the plurality of database partitions having database key values greater that the maximum value to the second partition. According to one embodiment, the partition component is further configured to identify database partitions having a sequential database key.

According to one embodiment, the system further comprises a plurality of servers, wherein the plurality of servers are configured to host the plurality of database partitions. According to one embodiment, the system further comprises a migration component configured to migrate database partitions between a plurality of servers configured to host the database partitions. According to one embodiment, the migration component is further configured to migrate the second partition responsive to the partition component splitting the partition. According to one embodiment, the migration component is further configured to determine a distribution of the plurality of partitions across the plurality of servers, in response to splitting, wherein the migration component is configured to migrate the second partition to a least loaded server identified based on the distribution. According to one embodiment, the migration component is further configured to deny write operations to data within the partition.

According to one embodiment, the system further comprises a rebalancing component configured to determine a state of the database based on a distribution of the plurality of partitions across the plurality of servers, wherein the rebalancing component is further configured to migrate at least one partition in response to the state indicating an imbalanced distribution of partitions. According to one embodiment, the rebalancing component is further configured to determine a partition count for each server. According to one embodiment, the rebalancing component is further configured to determine a different between a least loaded server and a most loaded server. According to one embodiment, the rebalancing component is further configured to migrate partitions until difference between the most loaded server and the least loaded server is less than or equal to 2. According to one embodiment, the rebalancing component is further configured to migrate partition from most loaded server to least loaded server.

According to one embodiment, the system further comprises a routing component configured to route database requests to identified partitions, wherein the routing component is further configured to identify partitions based, at least, on key values associated with the data request. According to one embodiment, the routing component is further configured to identify partitions based on the key values used to organize range of data in at least one partition. According to one embodiment, the routing component is further configured to identify partitions based on indexed values within the data. According to one embodiment, the routing component is further configured to identify all partitions in response to data request requiring global access. According to one embodiment, the routing component is further configured to identify all partitions based on inability to identify specific partitions. According to one embodiment, the routing component is further configured to determine a received query does not include keyed information to identify specific partitions.

According to one embodiment, the system further comprises a configuration component configured to manage metadata information associated with each of the plurality of partitions, the metadata information including a defined range of key values associated with each partition. According to one embodiment, the configuration component is further configured to replicate the metadata across any routing component of the system. According to one embodiment, the configuration component is further configured to control versioning of the plurality of partitions. According to one embodiment, the configuration component is further configured to assign version numbers to the second partitions. According to one embodiment, the configuration component is further configured to verify split occurred properly. According to one embodiment, the configuration component is further configured to verify migration occurred properly. According to one embodiment, the configuration component is further configured to assign version numbers in response to verification.

According to one embodiment, the configuration component is further configured to update the metadata information in response to the partition component splitting the at least one of the plurality of database partitions into at least the first and the second partition. According to one embodiment, the configuration component is further configured to guarantee updates to the metadata. According to one embodiment, the configuration component is further configured to executed a two phase commit for updates to the metadata. According to one embodiment, the configuration component is further configured to update the metadata information in response to migration of database partitions between the plurality of servers. According to one embodiment, the configuration component is further configured to update the metadata in response to verification.

According to one embodiment, the system further comprises a reconciliation component configured to log database operations received on partitions during at least one of a migration operation and a splitting operation, wherein the reconciliation component is further configured to update at least one partition in response to the completion of a respective migration and splitting operation.

According to one aspect, provided is a computer implemented method for optimizing data distribution. The method comprises monitoring, by a computer system, a distributed database including a plurality of database partitions, wherein at least one of the plurality of database partitions includes a contiguous range of data from the database, detecting, by the computer system, a partition size of the at least one of the plurality of database partitions exceeds a size threshold, splitting, by the computer system, the at least one of the plurality of database partitions into at least a first and a second partition, controlling, by the computer system, a distribution of data within the first and the second partition based on a value for a database key associated with the data in the at least one of the plurality of database partitions, wherein controlling the distribution includes minimizing any data distributed to the second partition based on a maximum value for the database key associated with the data in the at least one of the plurality of database partitions.

According to one embodiment, the method further comprises identifying a collection comprising a group of database partitions having a sequential database key, and wherein controlling the distribution occurs in response to an identification of the sequential database key. According to one embodiment, the method further comprises defining the first partition having a minimum key value and a maximum key value less than or equal to the maximum key value for the partition's data and defining the second partition range to include values greater than or equal to the maximum key value. According to one embodiment, the method further comprises locking the partition for write requests in response to execution of splitting operations.

According to one embodiment, minimizing any data distributed to the second partition includes acts of assigning at least any data in the at least one of the plurality of database partitions having database key values less than the maximum value to the first partition, and assigning at least any data in the at least one of the plurality of database partitions having database key values greater that the maximum value to the second partition.

According to one embodiment, the method further comprises hosting the distributed database on a plurality of servers, wherein the act of hosting the distributed database includes hosting the plurality of database partitions on the plurality of servers. According to one embodiment, the method further comprises an act of identifying a sequential database key, wherein the act of controlling is executed responsive to the act of identifying the sequential database key.

According to one embodiment, the method further comprises an act of migrating database partitions between the plurality of servers. According to one embodiment, migrating the database partitions further comprises migrating the second partition responsive to splitting the database partition. According to one embodiment, migrating the database partitions further comprises determining a distribution of the plurality of partitions across the plurality of servers, in response to splitting, wherein migrating the database partitions includes an act of migrating the second partition to a least loaded server identified based on the distribution. According to one embodiment, the method further comprises denying write operations to data within the partition.

According to one embodiment, the method further comprises determining a state of the distributed database based on a distribution of the plurality of partitions across the plurality of servers, and migrating at least one partition in response to the state indicating an imbalanced distribution of partitions. According to one embodiment, the method further comprises determining a partition count for each server. According to one embodiment, the method further comprises determining a different between a least loaded server and a most loaded server. According to one embodiment, the method further comprises migrating partitions until difference between the most loaded server and the least loaded server is less than or equal to 2. According to one embodiment, the method further comprises migrating partitions from the most loaded server to the least loaded server.

According to one embodiment, the method further comprises an act of routing database requests to identified partitions, wherein the act of routing includes identifying partitions based, at least, on key values associated with the data request. According to one embodiment, identifying partitions includes identifying partitions based on the key values used to organize range of data in at least one partition. According to one embodiment, identifying partitions includes identifying partitions based on indexed values within the data. According to one embodiment, the method further comprising an act of identifying all partitions in response to data request requiring global access. According to one embodiment, the act of identifying all partitions includes identifying all partitions based on inability to identify specific partitions. According to one embodiment, the act of identifying all partitions includes determining a received query does not include keyed information to identify specific partitions.

According to one embodiment, the method further comprises an act of managing metadata information associated with each of the plurality of partitions, wherein the metadata information includes a defined range of key values associated with the data contained in each partition. According to one embodiment, the method further comprises an act of replicating the metadata across any routing component of the system. According to one embodiment, the method further comprises an act of controlling versioning of the plurality of partitions. According to one embodiment, the method further comprises an act of assigning version numbers to the second partition. According to one embodiment, the method further comprises an act of verifying splitting occurred properly. According to one embodiment, the method further comprises an act of verifying migration occurred properly. According to one embodiment, the method further comprises an act of assigning version numbers in response to verification.

According to one embodiment, the method further comprises an act of updating the metadata information in response to splitting the at least one of the plurality of database partitions into at least the first and the second partition. According to one embodiment, the method further comprising an act of updating the metadata information in response to migration of database partitions between the plurality of servers. According to one embodiment, the method further comprises an act of guaranteeing updates to the metadata. According to one embodiment, the method further comprises an act of executing a two phase commit for updates to the metadata.

According to one embodiment, the method further comprising acts of logging database operations received during at least one of a migration operation and a splitting operation, reconciling at least one partition after completing the at least one of the migration operation and the splitting operation, wherein the act of reconciling includes an act of executing the logged database operations.

According to one aspect, provided is a computer-readable storage medium having computer-readable instructions that, as a result of being executed by a computer, instruct the computer to perform a method for optimizing data distribution. The method comprises acts of monitoring a distributed database including a plurality of database partitions, wherein at least one of the plurality of database partitions includes a contiguous range of data from the database, detecting a partition size of the at least one of the plurality of database partitions exceeds a size threshold, splitting the at least one of the plurality of database partitions into at least a first and a second partition, controlling a distribution of data within the first and the second partition based on a value for a database key associated with the data in the at least one of the plurality of database partitions, wherein controlling the distribution includes minimizing any data distributed to the second partition based on a maximum value for the database key associated with the data in the at least one of the plurality of database partitions.

According to one embodiment, the method further comprises identifying a collection comprising a group of database partitions having a sequential database key, and wherein controlling the distribution occurs in response to an identification of the sequential database key. According to one embodiment, the method further comprises defining the first partition having a minimum key value and a maximum key value less than or equal to the maximum key value for the partition's data and defining the second partition range to include values greater than or equal to the maximum key value. According to one embodiment, the method further comprises locking the partition for write requests in response to execution of splitting operations.

According to one embodiment, minimizing any data distributed to the second partition includes acts of assigning at least any data in the at least one of the plurality of database partitions having database key values less than the maximum value to the first partition, and assigning at least any data in the at least one of the plurality of database partitions having database key values greater that the maximum value to the second partition.

According to one embodiment, the method further comprises hosting the distributed database on a plurality of servers, wherein the act of hosting the distributed database includes hosting the plurality of database partitions on the plurality of servers. According to one embodiment, the method further comprises an act of identifying a sequential database key, wherein the act of controlling is executed responsive to the act of identifying the sequential database key.

According to one embodiment, the method further comprises an act of migrating database partitions between the plurality of servers. According to one embodiment, migrating the database partitions further comprises migrating the second partition responsive to splitting the database partition. According to one embodiment, migrating the database partitions further comprises determining a distribution of the plurality of partitions across the plurality of servers, in response to splitting, wherein migrating the database partitions includes an act of migrating the second partition to a least loaded server identified based on the distribution. According to one embodiment, the method further comprises denying write operations to data within the partition.

According to one embodiment, the method further comprises determining a state of the distributed database based on a distribution of the plurality of partitions across the plurality of servers, and migrating at least one partition in response to the state indicating an imbalanced distribution of partitions. According to one embodiment, the method further comprises determining a partition count for each server. According to one embodiment, the method further comprises determining a different between a least loaded server and a most loaded server. According to one embodiment, the method further comprises migrating partitions until difference between the most loaded server and the least loaded server is less than or equal to 2. According to one embodiment, the method further comprises migrating partitions from the most loaded server to the least loaded server.

According to one embodiment, the method further comprises an act of routing database requests to identified partitions, wherein the act of routing includes identifying partitions based, at least, on key values associated with the data request. According to one embodiment, identifying partitions includes identifying partitions based on the key values used to organize range of data in at least one partition. According to one embodiment, identifying partitions includes identifying partitions based on indexed values within the data. According to one embodiment, the method further comprising an act of identifying all partitions in response to data request requiring global access. According to one embodiment, the act of identifying all partitions includes identifying all partitions based on inability to identify specific partitions. According to one embodiment, the act of identifying all partitions includes determining a received query does not include keyed information to identify specific partitions.

According to one embodiment, the method further comprises an act of managing metadata information associated with each of the plurality of partitions, wherein the metadata information includes a defined range of key values associated with the data contained in each partition. According to one embodiment, the method further comprises an act of replicating the metadata across any routing component of the system. According to one embodiment, the method further comprises an act of controlling versioning of the plurality of partitions. According to one embodiment, the method further comprises an act of assigning version numbers to the second partition. According to one embodiment, the method further comprises an act of verifying splitting occurred properly. According to one embodiment, the method further comprises an act of verifying migration occurred properly. According to one embodiment, the method further comprises an act of assigning version numbers in response to verification.

According to one embodiment, the method further comprises an act of updating the metadata information in response to splitting the at least one of the plurality of database partitions into at least the first and the second partition. According to one embodiment, the method further comprising an act of updating the metadata information in response to migration of database partitions between the plurality of servers. According to one embodiment, the method further comprises an act of guaranteeing updates to the metadata. According to one embodiment, the method further comprises an act of executing a two phase commit for updates to the metadata.

According to one embodiment, the method further comprising acts of logging database operations received during at least one of a migration operation and a splitting operation, reconciling at least one partition after completing the at least one of the migration operation and the splitting operation, wherein the act of reconciling includes an act of executing the logged database operations.

BRIEF DESCRIPTION OF THE DRAWINGS

Various aspects of at least one embodiment are discussed herein with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. Where technical features in the figures, detailed description or any claim are followed by references signs, the reference signs have been included for the sole purpose of increasing the intelligibility of the figures, detailed description, and/or claims. Accordingly, neither the reference signs nor their absence are intended to have any limiting effect on the scope of any claim elements. In the figures, each identical or nearly identical component that is illustrated in various figures is represented by a like numeral. For purposes of clarity, not every component may be labeled in every figure. In the figures:

DETAILED DESCRIPTION

According to one aspect, a database management system can be configured to minimize overhead associated with horizontal scaling of database operations. In some embodiments, any conventional database system can be configured for horizontal scaling, and more particularly, the database system can be augmented to enable sharding of the data and distribution of the database shards across multiple machines. A server can host multiple shards of data, and each shard can be configured to respond to database requests as if the shard was a complete database. In one embodiment, a routing process can be employed to ensure the database requests are routed to the appropriate shard or shards. Sharding refers to the process of partitioning the database into partitions, referred to as "shards." Conventional databases such as network-based, file-based, entity-based, relational, and object oriented, can be configured to operate within a sharded environment. It is appreciated that various aspects of the present invention can be practiced in association with any type of database, database organization, and/or database management system.

Figure 1:
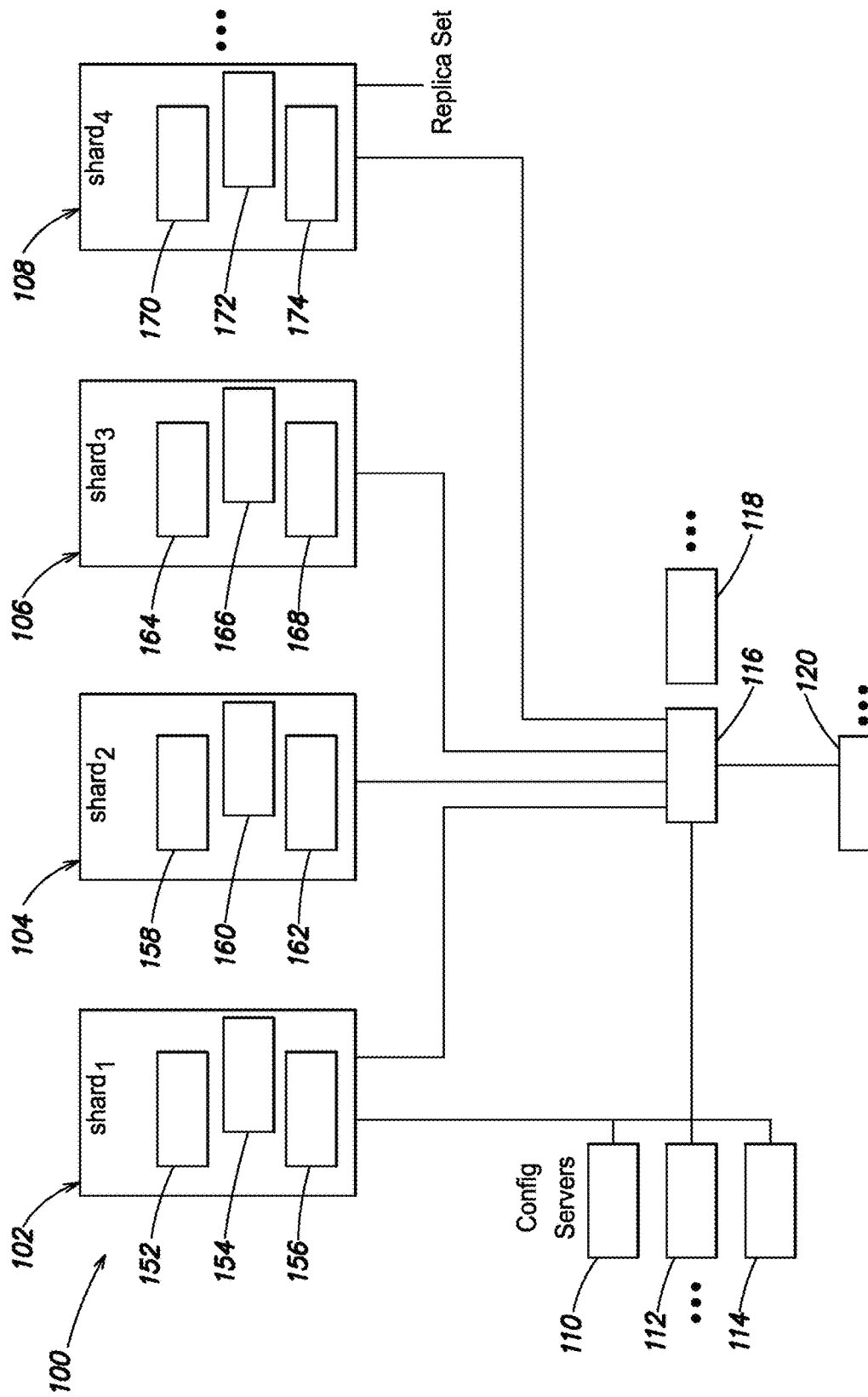
FIG. 1 illustrates a block diagram of an example architecture for a database management system according to aspects of the invention.

FIG. 1 shows a block diagram of an example architecture for a managed database system 100. The managed database system 100 has been specially configured as a shard cluster. The shard cluster is the grouping of shards that collectively represent the data within the database A shard cluster typically comprises multiple shard servers (e.g., 102-108) hosting multiple partitions (e.g., 152-174) or shards of data, one or more configuration servers (e.g., 110-114) for metadata management, and shard router processes (e.g., 116-118). Metadata for the shard cluster can include, for example, information on the ranges of data stored in each partition, information associated with managing the shard cluster, partition counts, number of shard servers, data index information, partition size constraints, data distribution thresholds, among other options.

Each shard of data (e.g., 152-174) can be configured to reside on one or more servers executing database operations for storing, retrieving, managing, and/or updating data. In some embodiments, a shard server 102 contains multiple partitions of data which can also be referred to as "chunks" of database data. In some embodiments, a shard of data corresponds to a chunk of data. A chunk is also a reference to a partition of database data. A chunk can be configured as a contiguous range of data from a particular collection in the database. Collections are logical organizations of subsets of database data. In one example, a collection of documents is a named grouping of the data, for example, a named grouping of documents. The named grouping can be homogenous or heterogeneous. In some embodiments, collections are organizations of database data similar to relational database tables.

Configurations within a shard cluster can be defined by metadata associated with the managed database referred to as shard metadata. Shard metadata can include information on collections within a given database, the number of collections, data associated with accessing the collections, database key properties for a given collection, ranges of key values associated with a given partition, shard, and/or chunk of data within a given collections, to provide some examples.

In some embodiments, sharding of the database in data chunks, that is the partitioning of the data in the database, occurs based on database collections rather than the database as a whole. For example, when implementing a database management system for a service like the well-known TWITTER service, it is appreciated that the collection of "tweets" or messages within the database of the TWITTER service would be several orders or magnitude larger than the next largest collection. The size and throughput associated with the collection of tweets would be ideal for sharding, whereas smaller collections can be configured to reside on a single server. In some implementations, the data within the database is organized into documents. Some examples of document organization formats include the known JSON (JavaScript Object Notation) and BSON (binary encoded serialization of JSON) formatting for documents. BSON is a binary format in which zero or more key/value pairs are stored as a single entity. The BSON entity can be referred to as a document. In some examples, BSON is designed to be efficient in space, but in many cases is not much more efficient than JSON. In some cases BSON can employ more space than JSON to encode information. In one embodiment, this results from on e of the BSON design goals: traversability. In some examples, BSON adds some additional information to documents, like length prefixes, that make it the document easier and faster to traverse.

BSON is also designed to be fast to encode and decode. For example, integers are stored as 32 (or 64) bit integers, so they don't need to be parsed to and from text. This uses more space than JSON for small integers, but is much faster to parse.

Returning to FIG. 1, the three dots illustrated next to the system components indicate that the system component can be repeated. In some embodiments, adding additional shards, configuration servers, and/or shard routing processes can increase the capacity of the managed database system. The shard router processes 116-118 handle incoming requests from clients 120 (e.g., applications, web services, user initiated requests, application protocol interfaces, etc). The router processes 116-118 are configured to provide a transparent interface to handle database requests. In particular, client 120 need not know that a database request is being served by a sharded database. The shard router processes receive such client requests and route the database requests to the appropriate shard(s), e.g., 152-174 on shard servers 102-108.

According to some embodiments, a router process, e.g., 116, can be configured to operate as a routing and coordination process that makes the various components of the cluster look like a single system, for example, to client 120. In response to receiving a client request, the router process 116 routes the request to the appropriate shard or shards. The shard(s) return any results to the router process. The router process 116 can merge any results and communicate the merged result back to the client 120. In some examples, the router process 116 is also configured to establish current state information for the data distributed throughout the database by requesting metadata information on the database from the configuration server(s) 110-114. The request for metadata information can be executed on startup of a routing process. Further requests can be initiated by the routing process and/or can be initiated by a configuration server. In one example, a change at the configuration server can trigger a distribution of updates to any routing processes.

In some embodiments, any changes that occur on the configuration server(s) can be propagated to each router process 116-118, as needed. In one example, router processes 116-118 can be configured to poll the configuration servers(s) 110-114 to update their state information periodically. In others examples, router processes can be configured to poll the configuration servers(s) 110-114 to update their state information on a schedule, periodically, intermittently, and can be further configured to received updates pushed from the configuration server(s) 110-114 and/or any combination of thereof. According to one embodiment, the router processes capture metadata information on the shard cluster stored at the configuration servers. In some examples, the metadata information includes information on the data stored in the database, how the data is partitioned, version information associated with the partitions, database key values associated with partitions, etc. According to some embodiments, the router process 116 can be configured without persistent state information. For example, at initiation the router process 116 cannot fully route data requests until its state is updated with the metadata describing the distribution of data throughout the shards.

According to some embodiments, router processes can run on any server within the managed database and/or on any number of server(s) that is desired. For example, the router processes can be executed on stand-alone systems, and in other examples the router processes can be run on the shard servers themselves. In yet other examples, the router processes can be run on application servers associated with the managed database. Under typical installations, there are no limits on the number of router processes that can be invoked. The addition of routing processes can permit the managed database to route greater number of requests to the appropriate shards of data. In some embodiments, additional routing process can enable additional client connections to the partitioned database. In other embodiments, additional routing processes can facilitate management of the distribution of data within the database.

In some embodiments, each router process can be configured to act independently of any other routing processes being executed within the managed database. In some examples, the router processes do not coordinate processing, rather each router process can be configured to act independently. In some environments, this property enables unlimited numbers of router processes with virtually no additional complexity, as all the router processes receive their state information from the configuration servers and no coordination between the router processes is required for routing data requests.

According to one embodiment, configuration server(s) 110-114 are configured to store and manage the database's metadata. In some examples, the metadata includes basic information on each shard in the shard cluster (including, for example, network communication information), server information, number of chunks of data, chunk version, number of shards of data, shard version, and other management information for routing processes, database management processes, chunk splitting processes, etc. According to some embodiments, chunk information can be the primary data stored by the configuration server(s) 110-116. In some examples, chunks are defined by a triple (collection, minKey, and maxKey) and the metadata stored on the configuration servers establishes the relevant values for a given chunk of data.

In some examples, each of the installed configuration server(s) has a complete copy of all the chunk metadata information for the managed database. According to one aspect, various replication strategies can be implemented to maintain consistency between configuration servers. In one embodiment, updates to configuration data stored on the configuration server can require additional processes for insuring consistency. In one example, a two-phase commit operation, is used to ensure the consistency of the configuration data amongst the configuration servers. In other examples, various atomic commitment protocols (ACP) are used to ensure consistency of the database metadata on any configuration servers.

In addition to the consistency processes executed on the configuration servers, the shard cluster can be configured with various replication models to ensure consistent replication of any changes to the database's metadata stored on the configuration servers. In some embodiments, the replication model for the configuration servers can be different from the replication model used within the rest of the shard cluster, for example, on the shard servers 102-108. In one embodiment, the configuration servers can be configured to perform operations under various all-or-nothing approaches while the data stored in database shards can be configured to operate under an eventual consistency model.

In some implementations, if any of the configuration servers is or goes down, the shard cluster's metadata becomes read only. Various monitor processes can be implemented to ensure that any configuration servers within a given cluster are available. Upon detection of an unavailable configuration server, the monitor process can be configured to lock the data stored on the remaining configuration servers. The lock can be accomplished using a "locks" file that is referenced prior and/or during updates to the configuration servers. In response to a monitor process detecting a failed configuration sever (e.g. loss of communication, power failure, etc.) the monitor process can be configured to write a lock record into the locks file. In one example, a metadata update process can be configured to check the locks file to determine if any updating process can proceed. In one example, an update processes can be executed on the configuration servers, and in another example, can be executed on shard servers.

Additionally, the replication processes used to ensure consistency across the configuration servers can include information about the state of the data on the configuration servers. The state information can be used to halt update requests and/or return errors, for example, in response to attempts to update shard metadata. For example, a state variable stored on a configuration server can reflect that any of the configuration servers are reachable and available for updates. In the event of failure, the state variable can be updated to reflect the state of the failed configuration server. In some embodiments, when metadata updates are requested, an update process can be configured to check the current state of the data. In response to an identified failure state, an update process can be configured to return an error. In another example, the update process can be configured to block for a period of time, and re-attempt the update after the period of time has expired. Further update processes can be configured to wait a variable amount of time to re-try any failed update.

The configuration servers are configured to permit read only access in the event of the failure of one or more of the configuration servers. Thus, even when a configuration server has failed, as long as a configuration server is still available routing processes can received state information for the database. In the read only state, new shards cannot be established nor can data migration to new shards be finalized, however, even in such a failure state, the shard cluster can still process read and write operations on the database data, e.g., in response to client requests. Typically, sharded database systems can handle operating in read only mode for significant periods of time. Under typical operating conditions it can take a long period of time, days, even weeks, before the inability to rebalance and/or generate new shards will affect system performance.

According to some embodiments, establishing an appropriate shard key facilitates the efficient management of data within the shard cluster. To partition a collection, a shard key pattern can be specified. The shard key pattern, in some embodiments, can be similar to the key pattern used to define an index. The shard key pattern establishes one or more fields to define the shard key upon which the managed database can distribute data. In some embodiments, the shard key pattern can be input through a management process. The shard key pattern can be predefined and/or dynamically generated. Once established, the shard key pattern can be used to control the partitioning of data. The data can be partitioned in chunks of data. A shard of data can be a chunk. The chunks of data are typically constructed of contiguous ranges of data. According to one embodiment, the congruous range of data is defined based on database key values or database key patterns used associated with the data. In some examples, chunks are defined by a triple (collection, minKey, and maxKey). A given chunk can be configured with a named for the collection to which the chunk belongs corresponding to collection in the triples and a range of key values that defined the beginning and the end of the data found within the chunk corresponding to minKey and maxKey. In one example, the shard key K associated with a given document within a collection assigns that document to the chunk where the value for K falls within the values defined by minKey and maxKey. Thus, the shard database key/shard database key pattern defines the ranges of data found within a given chunk. The shard key ranges associated with a given partition can be used by the shard cluster (e.g. through a router process) to direct database requests to appropriate shard servers hosting the particular partition.

According to some embodiments, a chunk of a data can also be associated with a maximum size threshold which defines that maximum size a given chunk can reach before a splitting operations is performed on the data within the chunk. In some embodiments, once the data within a given chunk reaches the maximum size, a managed database or a shard cluster can be configured to automatically generate a new chunk having its own range of contiguous data. In some examples, the data within the original chunk is split, approximately half the data remaining in the original chunk and approximately half the data being copied into the new created chunk. Although in some embodiments, the split can occur so that different portions of data remain in the original chunk and/or are copied into the new chunk.

In some implementations, the maximum size can be predetermined. In other embodiments, the maximum size can be dynamically established. In one embodiment, a maximum size of 200 Mb establishes a good threshold that balances the costs of sharding (e.g., the computational burden associated with the copying/moving of the data and the versioning the chunks) against the improvement in processing by having sharded data. Various embodiments support compound shard keys/shard key patterns.

In some embodiments, the shard key should be selected to ensure they are granular enough to provide for an even distribution of data. For instance, when a shard key is based on name, the database can be checked to ensure there are not a disproportionate number of users with the same name. In such a case, an individual chunk can become too large and further, because of the key selected, be unable to split. In some implementations, logic can be implemented within the shard cluster to assist in selecting of the shard key. Distributions can be established and analyzed, for example during a testing phase, to ensure that key does not invoke disproportionate distributions. For example, where the entire range comprises just a single key on name and a disproportionate number of users share the same name, it can become impossible to split chunks of the data without creating a new shard key. Thus, for a database where it is possible that a single value within a shard key range might grow exceptionally large, a compound shard key can be constructed that enables further discrimination of the values that a single key selection.

Figure 2:
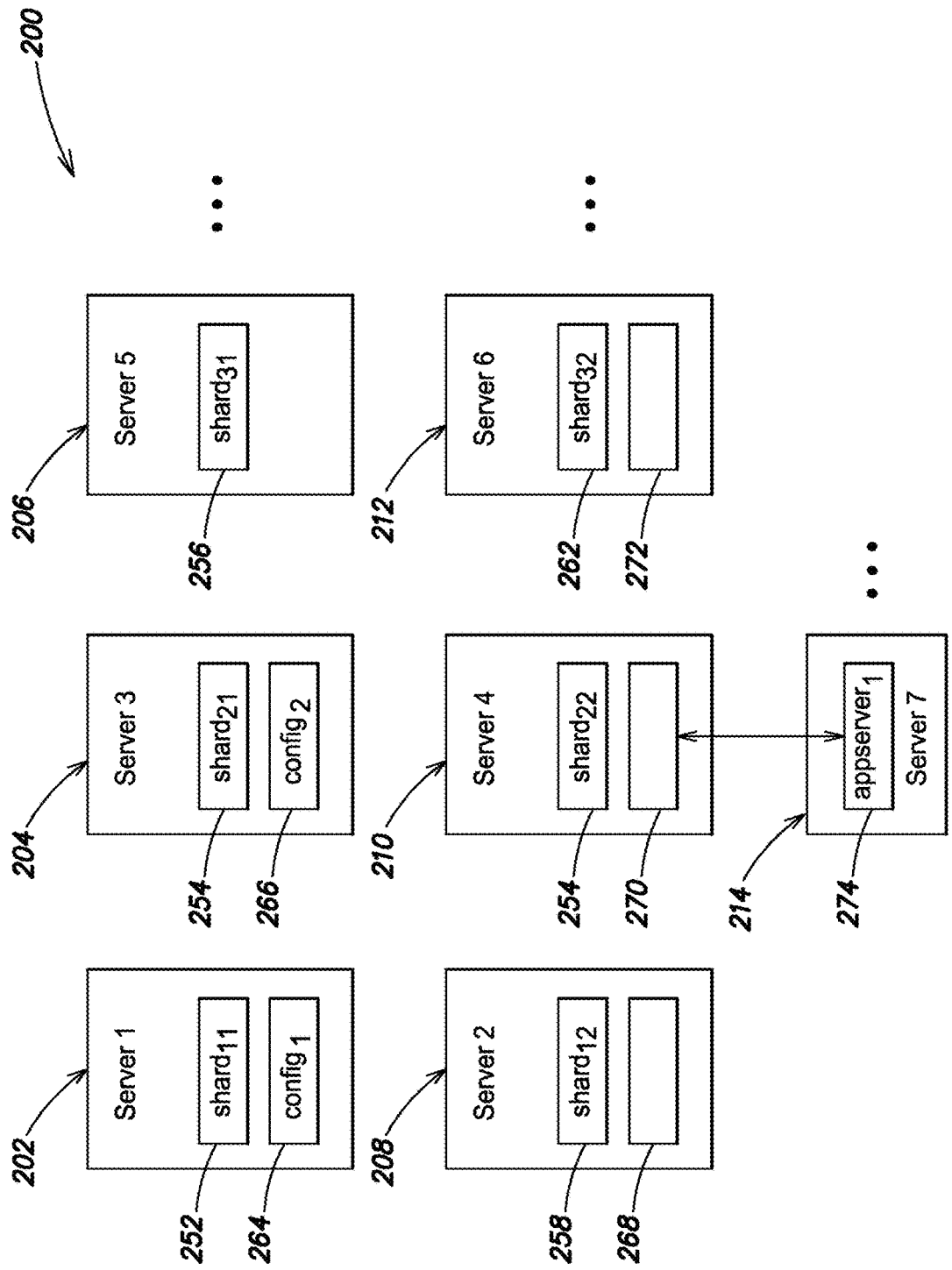
FIG. 2 illustrates a block diagram of an example architecture for a shard cluster, according to aspects of the invention.

FIG. 1 illustrates one example architecture for a managed database. In some embodiments, various configurations of the routing processes and the shard servers are possible. Shown in FIG. 2 is a block diagram of an example architecture for a database managed as a shard cluster. FIG. 2 illustrates an example configuration of a shard cluster 200. Servers 202-212 host the various shards of data that make up the data of a managed database. Each shard 252-262 has an associated versioning number that assist the system in tracking various versions. The versioning numbers can be used during creation of new shards and, in some examples, can be assigned only when the data associated with a new shard has been tested correct. For example, during a data move from one server to another, a process can control the copying and verification of the moved copy. Further logic can be implemented to facilitate data availability. In one example, the shard and an associated chunk of data being moved can still be read from and written to in its original location. Until the shard metadata is updated, routing processes will continue to route data requests to the original shard location. In one embodiment, the process for copying and/or moving the data chunk can include operation reconciliation to resolve data requests that occur during a migration. The operation reconciliation can be configured to resolve any changes in a chunk that occurs during the move process.

Configuration processes 264 and 266 are executed on servers 202-204. As discussed above with respect to the configuration servers, the configuration processes control the metadata information associated with the shard cluster. Further, the routing processes 268-272 running on servers 208-212 receive their state information from the configuration processes 264-266. As shown, server 214 hosts the client application server 274 which manages client requests. The client requests are communicated to a routing process, as illustrated, process 270, which, in some examples, can determine from the received request, which database shard or chunks are necessary to respond. Routing process 270 forwards the request to the appropriate shards. The shards capture any relevant data and return it to the calling routing process. The routing process, e.g., 270, can be configured to merge the results, as necessary, and communicate the result to the client appserver 274.

Figure 3:
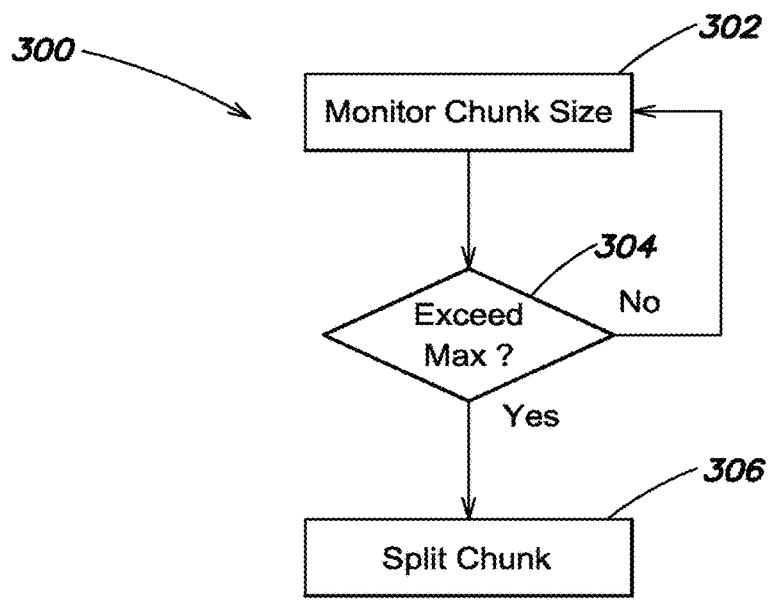
FIG. 3 illustrates an example process flow for monitoring data size, according to aspects of the invention.

In one embodiment, data within the database is organized into BSON type documents. A BSON document is a binary-encoded serialization of JSON-type document. BSON can be configured to be lightweight, traversable, and efficient. BSON documents, like JSON counterparts, are configured to support the embedding of objects and arrays within other objects and arrays. The documents can be organized into collections, and each collection can be distributed onto a number of shard servers based, in part, on the size of the respective collection. During normal operation a shard cluster can be configured to monitor shard size or chunk size on the shard servers and create new shards or chunks as needed. FIG. 3 illustrates an example process flow 300 for generating new chunks within a shard cluster. Process 300 likewise can be executed to generate new database shards with associated chunks of data. A routing process can be configured to execute the monitor process 300. The routing process can be configured to monitor chunk size across each of the shards in the database at 302. In some alternatives, individual shards can be configured to monitor the sizes of their chunks, and/or the size of chunks located on other shards. In one example, the routing process can be configured to monitor chunk size at 302 based on metadata for the shard cluster. If the threshold for chunk size is exceeded 304 (YES), the routing process can be configured to executed a procedure for splitting chunks at 306, otherwise at 304 (NO) monitoring continues at 302.

The threshold for chunk size can be established through a management interface displayed to an end user at a host computer system. In some settings, the management interface is configured to allow an end user (e.g., an administrator) to define the threshold. Typical thresholds fall within a range of 100-200 Mb, however, other thresholds can be used. In some embodiments, splitting processing and/or migration processing can be monitored to determine if the threshold is inappropriate. Fine tuning to the threshold can be performed automatically. For example, if processing associated with splitting chunks occurs too frequently or over too great a period of time, the system can be configured to increase the threshold chunk size. Alternatively, chunk size can be decreased if little or no activity occurs over an analyzed period. According to one embodiment, such a period would typically be quite long days, even in some examples weeks, before triggering a reduction in chunk size. In some implementations, processing consumption by components of the shard cluster can be monitored and logged to determine that the processing associated with splitting and/or migrated chunks consume too much (in one alternatively too little) of the processing resources of the cluster. In one example, if the processing exceeds 10% of the clusters processing capacity the chuck size could be decreased automatically.

Figure 4:
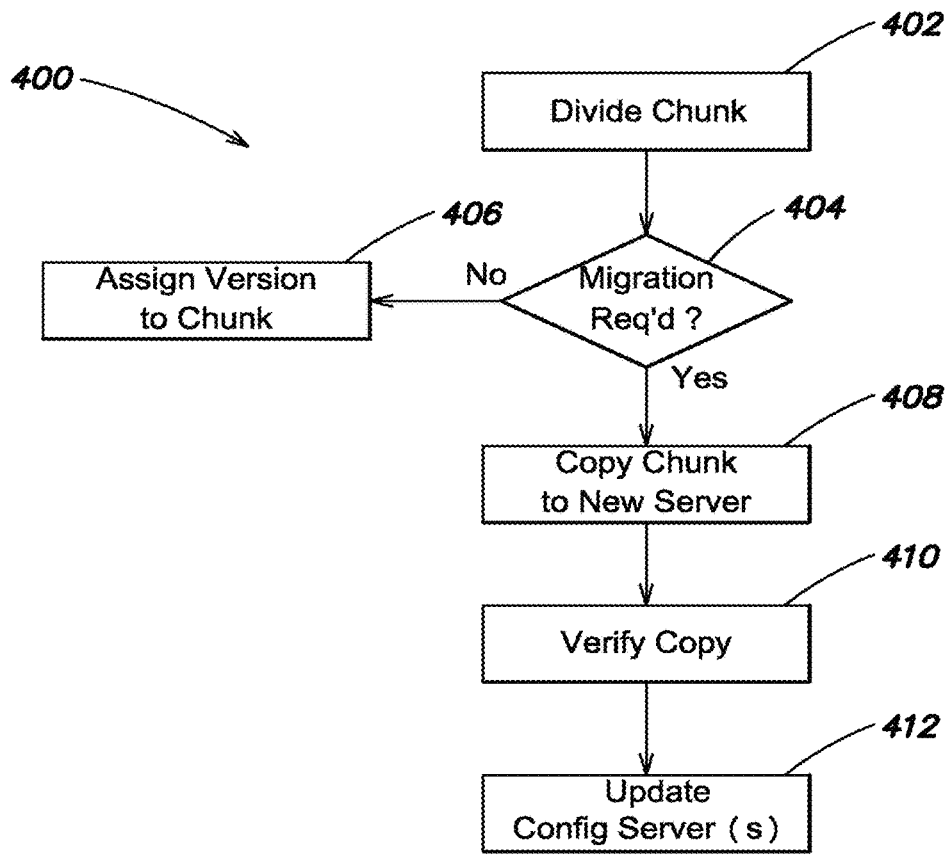
FIG. 4 illustrates an example process flow for dividing data, according to aspects of the invention.

Step 306 can include execution of other processes and/or sub-processes for splitting data chunks. Shown in FIG. 4 is an example process 400 for dividing and/or migrating a chunk to a new server, executed as necessary. Process 400 can also be executed to generate new shards with associated chunks of data. Once a chunk maximum size has been exceeded, the chunk is divided or split at the server on which it currently resides at 402. According to one embodiment, during division the data within the chunk is still fully accessible to client operations (e.g., read, write, insert, update, etc.). Process 400 can include operations to resolve changes made to documents within the database during division and/or migration. For example, the chunk can remain fully accessible until a version number is assigned to the new chunk at 406 or a chunk copy is verified and given a new version number at 410. In some examples, creation of a new chunk can include splitting the chunk with the data as it exists when the split is initiated. The new generated chunk can be updated using an operation log that tracks all of the operations that have been performed on the original chunk not reflected in the new chuck. Shards can be versioned in according with the same process. In some examples, shards can be assigned versions numbers based on the versions of an associated chunk of data.

At 404 it is determined whether migration is required for the newly divided chunk. In one implementation, a balancing component can be configured to monitor chunk distribution across shards. Where chunk distribution is unbalanced a determination is made at 404 (YES) that migration is required. The new chunk is copied to another shard server configured to host a portion of the database at 408. The copying activity is typically configured to occur at a reduced pace. In some embodiments, the goal is to prioritize client data requests over migration operations. In other embodiments, copying at 408 will only take place if there is sufficient capacity on the shard server. Process 400 can be configured to determined current processing load on the shard server. In some examples, both the source and destination servers can be tested to determine a baseline processing capacity is available. Further, the shard cluster can be configured to determine if a baseline network bandwidth limitation is satisfied prior to processing the copy. In some examples, copy operations can be limited to scheduled windows, and process 400 can include steps to delay chunk splitting until a window occurs.

In some alternatives, the determination that a chunk should be divided can be followed immediately by a test to determine if migration may be required. If not, then splitting can proceed, however, if migration is necessary the process also can be delayed to occur in a specified window. The time window is configured to minimize migration operations at peak activity. The time window can be manually entered by an end-user and/or dynamically established by the shard cluster to adapt to changes in use of the cluster.

Once copying is completed, the new chunk will be verified at 410 to ensure a complete and consistent copy has been generated. In some embodiments, the verification process can include applying any updates to the data handled by the original shard during the copying process. Once the new chunk is verified and/or new operations are applied, the new chunk is given a new version number and the configuration server(s) are updated at 412. The verification step 410, can include an operation to lock the data records during the versioning of the new chunk. For example, a locks filed can be written to, to include a document reflecting that the new chunk is locked for writes. In some embodiments, reads can still occur. In some embodiments, the original chunk can be locked as well (e.g., to writes) to ensure a consistent copy is generated.

In one embodiment, each chunk can be assigned a major and minor version number. In some embodiments, shard clusters can be configured to use version numbers to route database requests. For example, configuration servers can store metadata information on the shard cluster, including versions numbers for any available chunk. In some examples, metadata information includes key ranges associated with the data stored in each chunk. In one example, a routing component can capture the metadata from the configuration server(s) and direct data requests appropriately. According to one embodiment, the major version number is associated with a shard hosting chunks, and each individual chunk is assigned a unique minor number on that shard. Assignment of version numbers can occur as part of step 410. In some embodiments, the configuration servers are configured to control at least parts of process 400. For example a versioning component can be executed on a configuration server that controls versioning of a chunk. In other embodiments, the configuration servers can include a verification component that is configured to verify a new chunk copy is consistent. In some embodiments, the functions for verifying and versioning can be handled concurrently, separately, serially, and can be controlled by one, the other, or both of the verification and/or versioning components.

Figure 5:
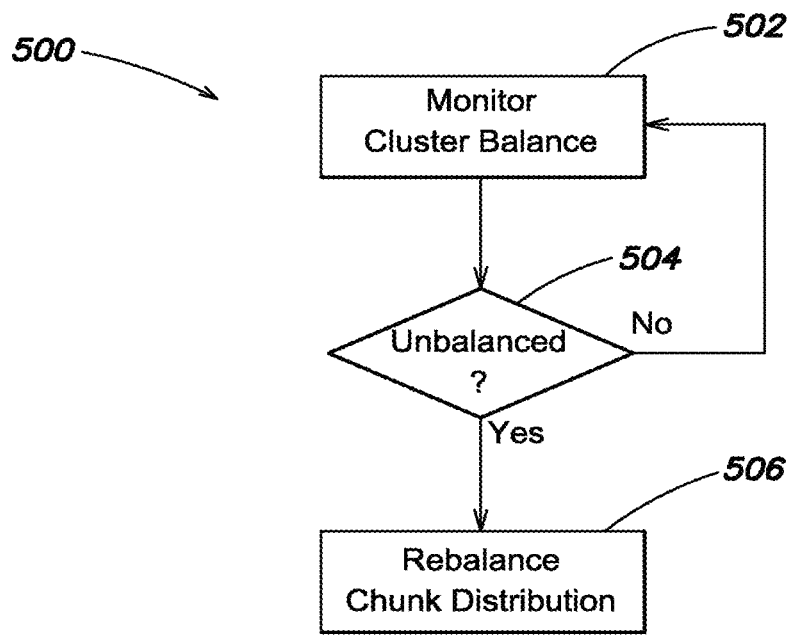
FIG. 5 illustrates an example process flow for rebalancing data distribution according to aspects of the invention.

According to some embodiments, processes for splitting chunks can be executed in conjunction with processes for rebalancing chunk distribution within a shard cluster. FIG. 5 shows an example process flow 500 for rebalancing chunks within a shard cluster. Process 500 can be executed to rebalance shard distribution throughout the database according to the same process. At 502 the distribution of chunks is monitored. A software based monitor can be executed on various hardware elements, and the monitor can be configured to analyze the distribution of chunks across shard servers. In some embodiments, a monitor can be configured to query data from the configuration servers and in others the monitors can be configured to query the shard servers directly.

At 504, the chunk distribution is analyzed to determine if there in an imbalance. At 504 (YES), the shard cluster can determine that an imbalance is present. The shard cluster is configured to rebalance the chunk distribution at 506. In some embodiments, a monitor component can be configured to execute monitor processes, can be configured to determine chunk distribution is imbalanced, and/or can further be configured to migrate chunks between shard servers. When no imbalance is detected 504 (NO), step 502 is repeated. The monitoring activity can be repeated periodically, on a schedule, and/or can be dynamically initiated. Further, a shard cluster can be configured with manual processes to initiate a monitoring and/or redistribution process. In one example, an end-user can initiated monitoring and/or rebalancing from a management interface.

According to one embodiment, monitoring the shard cluster at 502 includes determining a chunk count for each shard server in the shard cluster. In order to determine that a shard cluster is imbalanced, a variety of operations can be performed. In one example, comparisons are made between the shard server having the largest number of chunks and the shard server having the least number of chunks. Where the compared values indicate a difference in distribution greater than an established threshold, the shard cluster is configured to determine the shard cluster imbalanced, for example, at 504 (YES). In some settings, a state variable can be modified to indicate that the shard cluster is imbalanced, in other settings, once imbalance is identified, a rebalancing process can be executed. As rebalancing typically involves migrating chunks between shard servers, rebalancing activity can be delayed until a scheduled window occurs.

For example, burdensome operations can be delayed until a minimum processing capacity is detected. In another example, rebalancing windows can be established to favor times of lower database usage. In other embodiments, the processes for controlling monitoring and/or rebalancing can be given lower priority than other database operation, favoring execution of client data requests, for example, over monitoring and/or rebalancing.

The established threshold for identifying imbalance can be set in advance and/or, dynamically determined by the shard cluster. In some embodiments, the threshold can be entered by an end-user in a management interface. In one example, the threshold is based on a chunk count on the most burden shard server exceeding a chunk count on the least burdened shard server by at least eight chunks. The initial threshold can be arbitrarily selected. In some embodiments, the lower the threshold the greater the volume of rebalancing processing that will result. In some settings, a monitor process can be configured to determine that the processing of the shard cluster consumes too much of the shard cluster's resources. In response to a determined that rebalancing consumes too much processing capacity (for example by exceeding a user defined threshold) the shard cluster can dynamically increase the threshold, thereby reducing rebalancing across the cluster. The shard cluster can also be configured to reduce the threshold, where little or no rebalancing processing has been detected by the shard cluster. Further, a user can set and re-set thresholds for the shard cluster that establish when a cluster is imbalanced.

Various statistics can be used to determine when a shard cluster is imbalanced. In particular, a determination that a shard cluster is imbalanced is not limited to differences in chunk count between a least loaded server and a most loaded server. For example, a chunk count distribution can be determined to exceed a mean and/or exceed an average across the shard cluster. In some examples, individual shard servers can be rebalanced if their associated chunk count exceeds a threshold. In other embodiments, imbalance can be determined on processing distribution in addition to and/or instead or chunk count. Other metrics can also be employed to determine a cluster is imbalanced. As before, once an imbalance is identified, the shard cluster is configured to automatically re-allocate chunks to reduce the imbalance, for example, at step 506 of process 500.

Figure 6:
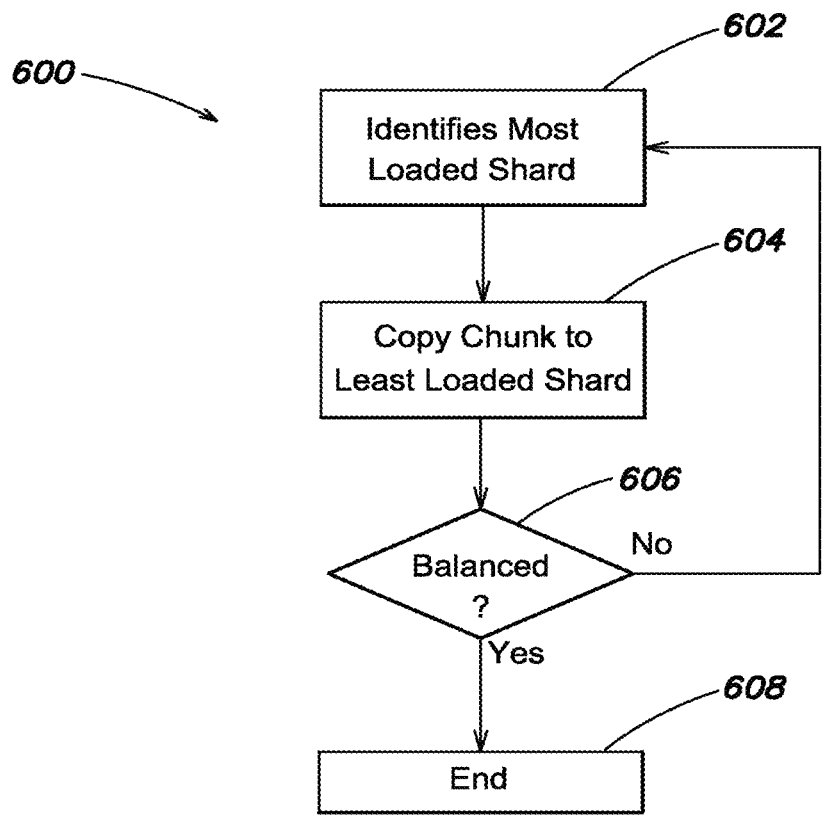
FIG. 6 illustrates an example process for data migration, according to aspects of the invention.

FIG. 6 illustrates an example process flow 600 for rebalancing chunks across a shard cluster. At 602, a most loaded shard is detected. At 604, a chunk from the most loaded shard server is migrated to another shard server. According to some embodiments, a chunk count associated with the shard servers in the shard cluster can be used to identify a most and least loaded shard. At 604, the chunk form the most loaded shard server can be copied to the least loaded shard. Typically, a rebalancing operations proceeds on a chunk by chunk basis, copying one chunk at a time and testing the chunk count after copying to determine if the shard cluster is sufficiently rebalanced at 606. If at 606 (NO) the shard cluster is not sufficiently rebalanced an additional chunk is copied from a most loaded shard server (e.g., identified at 602) to a least loaded shard server (e.g., identified at 604). The cluster is again tested against a balance metric to determine if additional repetitions of 602-606 are required. In some embodiments, the shard cluster has an established threshold for determining that the shard cluster is imbalanced. Likewise a range can be established that defines a rebalanced shard cluster. It can be possible to reduce differences in chunk count to zero, however, in typical implementations the threshold is greater than a zero difference. It is also possible that a rebalancing process cannot reduce the difference in chunk count between a most loaded shard and least loaded shard to zero owning to the number of shards, shard servers, and/or the number of chunks in a cluster. In one embodiment, once the count difference reaches 2 or less, the state of the cluster can be changed from an imbalanced state to a balanced state. In one example, once the count difference reaches an established threshold 606 (YES), process 600 ends at 608. One should appreciate that process 600 is illustrated as one example process for rebalancing chunk distribution. Other processes can be executed to redistributed chunks across a cluster. Further process 600 can be used to rebalance shard and associated chunks of data.

In some embodiments, a shard cluster also includes processes for automatic failover and/or recovery. Proper operation of a shard cluster can require that each shard always remain online, or from a more practical standpoint, as available as is reasonably possible. Inconsistent results can be returned if one of the shards hosting necessary data is unavailable. According to one embodiment, each shard server in a shard cluster can be implemented as a replica set, e.g., shard server 108. A replica set can be configured to perform asynchronous replication across a series of nodes, with various processes implemented to handle recovery of primary node operations within the replica set. Such a configuration ensures high availability of the data replicated throughout the replica set. By implementing each shard as a replica set, the shard cluster can provide for high availability and high consistency in the underlying data. In one example, a replica set can be a set of n servers, frequently three or more, each of which contains a replica of the entire data set for the given shard. One of the n servers in a replica set will always be a primary node. If the primary node replica fails, the remaining replicas are configured to automatically elect a new primary node. Each server 202-212 can be implemented as a replica set, for example, as discussed in co-pending application Ser. No. 12/977,563 entitled "METHOD AND APPARATUS FOR MAINTAINING REPLICA SETS" filed on Dec. 23, 2010, incorporated herein by reference in its entirety. Other replication methodologies can be used to ensure each shard remains available to respond to database requests. In some examples, other multi-node systems can be used to provide redundancy within a sharded database. In one example, master/slave configurations can be employed. In others, various distributed architectures can be used for each shard within the shard cluster.

According to some embodiments, shard clusters also include operations for balancing the distribution of chunks across shards. According to one example, a balancer component executes a balancer process as a background process across the shard cluster. In one implementation, the balancer process can be executed by a balancer component executed on a configuration server or servers, on the shard server(s), and/or as part of routing processes. In some embodiments, the balancer process can be executed as a stand-alone process. Once instantiated the balancer process is configured to monitor the number of chunks distributed throughout the shard cluster and balance the distribution as appropriate. In one embodiment, the balancer process can monitor the state of the shard cluster by monitoring the shard metadata stored on the configuration server(s). In other implementations, the balancer process can execute operations against the individual shard servers to determine associated state information. The balancer can be a background task configured to keep the number of chunks even across all servers of the cluster. The shard cluster can be configured to ensure the activity of balancing is transparent to any querying/updating activity that occurs across the database. According to some embodiments, a goal can be to ensure that the client side is unaware that there is any data allocation activity ongoing. The balancer component can be configured to perform any disclosed operation for shards of data.

According to some embodiments, the balancer is configured to reduce the computational burden associated with data movement. In some examples, the balancer process is configured to monitor current load on the database, and adjust data movement operations accordingly. Further, in some examples, the balancer process is configured to limit the amount of data being transferred at any given time. Typically, the assignment of a maximum chunk size assists in limiting the amount of data that needs to move whenever a new chunk is created. The typical unit of transfer in a shard cluster can be a chunk. In some examples, chunk size can be set at 200 MB, although other sizes can be employed. Various implementations of sharded databases have shown that a good threshold for chunk size falls within the range of 100-200 MBs of data per chunk. Although some implementation have been configured to use smaller sizes and/or larger chunk sizes, including for example, 64 MB as the chunk size. In some implementations, more than 200 MB can result in a data migration taking longer, which increases the risk of affecting response time for any client queries.

According to one embodiment, the balancer process is configured to determine a chunk count across the shard servers in the database. The balance process can be configured with a threshold for uneven chunk count. Once the threshold has been exceeded the balancer process can trigger migration of the chunks of data to re-establish a balanced distribution. According to one example, setting the threshold to require a difference of 8 chunks between the least and most loaded shards provides a good balance between invoking data migrations against the benefit of distributing chucks and consequently data accesses. Although in some embodiments, both larger and smaller thresholds can be used to determine when data migration would be appropriate. Further, other differences beyond an uneven chuck count can be analyzed to determine if data migration is appropriate. One should appreciate, that according to some embodiments, the balancer process should not incur the overhead of a data migration if the benefit in distributing the data does not exceed the incurred overhead.

Once the balancer determines that the uneven chunk count exceeds the threshold, the balance process is configured to redistribute chunks. In one example, the balancer process is configured to redistribute the uneven load one chunk at a time until the difference in chunks between any two shards in the cluster is down to, for example, 2 chunks. Other implementations can include complete rebalancing, so that the difference in the number of chunks between any two shards is minimized, reducing the difference between shared servers to 1 or less. Other stopping conditions can be implemented. Further, the rebalancing process can be configured to halt during periods of significant activity within the database, to ensure no significant latency to client requests is introduced. In one embodiment, the balancing task can be configured to execute at any arbitrary routing process server in a given shard cluster. In some embodiments, there can be several routing processes running on different servers, thus the balancing process can be configured to invoke a lock operation to ensure other routing process servers do not initiate a concurrent balancing process while another is undertaking data migration. The routing process service executing the balancer process takes a "lock" by inserting a document into a "locks" collection of the configuration database. The lock can be replicated across any additional configuration servers depending on the number of configuration servers. The balancer process can be configured to establish a lock in response to the balancer process being executed, a balancer process being active, and/or when the balancer process initiates balancing operations.

In some embodiments, a balancer process can be configured to check the state of any lock, or determine its absence on start-up. In other examples, the balancer process can be configured to periodically check for locks, or check the lock prior to starting any data migration operations. A balancer component can be configured to perform any of the operations associated with the discussed balance processes. The balancer component can be configured to execute the balancer processes and/or data migration processes.

According to another aspect, an overarching goal of a sharded database system is to minimize the impact of sharding operations on requests for data or data access. According to one embodiment, shard maintenance and data migration operations can be optimized based on properties of a key assigned to a collection of data. Stated generally, database shards and/or chunks represent ranges of ordered data within the database. The ordered ranges are based off of the keyed ordering of the underlying data. According to one example, sequential keys for any collection can be exploited to produce "zero cost" shards. Typically, data is organized into chunks and as the chunks grow past a threshold size, the chunk is split, which can result in the need to migrate a chunk populated with data. The size of the chunk that may need to be migrated will typically depend on the threshold established for chunk splitting. Such data migration represents an expensive process for maintaining sharded databases.

By analyzing the keys employed for a given collection, a sharded database system can ensure that any resulting copying from migrating chunks is minimal and, in some examples, completed without the need to copy database data from one shard to the next, even when a new chunk and/or shard must be generated on a different shard server. In one embodiment, a key type associated with a collection's key pattern is retained for optimizing the processing of chunk splitting and/or shard generation. In some implementations, the shard cluster is configured to analyze a key pattern for a given collection to determine a type for the key pattern automatically. In one example, the shard cluster is configured to determine if the key pattern is sequential. In some embodiments, an end-user can specify a key type for a given key pattern during key creation for a collection.

Figure 7:
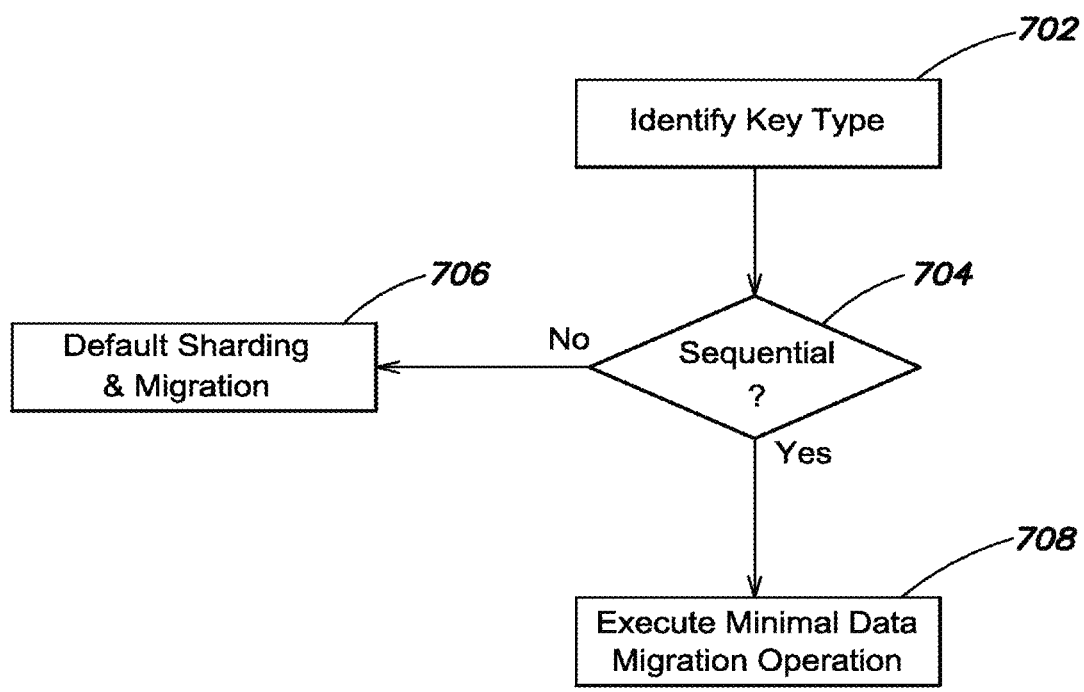
FIG. 7 illustrates an example process for optimizing data partitioning, according to aspects of the invention.

Shown in FIG. 7 is an example process flow for optimizing data sharding. At 702, a key type associated with a key pattern for a collection is analyzed to determine the type of the key that organizes the collection. Based on the type of the key assigned to the collection, a shard cluster can be configured to optimize the sharding of data within the database. According to one embodiment, at 704 (NO) it is determined that the key type is not sequential. For non-sequential keys/key patterns default sharding operations can be executed to manage data within the given collection, for example at 706. For example, processes 300 and/or 400 can be employed to manage data growth and migration for collections having non-sequential key types. In some examples, processes 500 and 600 can also be used either alone or in conjunction with 300 and/or 400 to manage data rebalancing for the given collection. In some embodiments, different processes can be executed to manage the size of the data and any chucks, as well as different processes for rebalancing data distribution throughout a shard cluster. In some alternatives, default processes for splitting and migration (e.g., 300 and 400) can be modified based on the presence of collections with sequential key types in a database cluster. The processes can be modified to prioritize key type optimized operations during execution as discussed further below. For example, default operation can be delayed if the shard cluster detects an optimized process is close to occurring. The shard cluster can be configured to determine state associated with optimized operations based on various thresholds, including timing metrics (e.g., average time to split), chunk size logging (e.g., at or near threshold for splitting) among other examples.

At 704 (YES), a sequential key pattern has been established for the collection under analysis. At 708, minimal data migration operations are executed. In some embodiments, minimal data migration operations replace default processes for chunk splitting and chunk migration across shard servers. In one example, a minimal data migration process includes some of the steps involved in, for example, process 300. The example minimal data migration process includes monitoring chunk size within the collection and determining that the chunk size exceeds a threshold. Although in some embodiments, different thresholds can be established for a maximum chunk size for a collection having a sequential key type versus collections without sequential key types. In one example, the maximum threshold for the chunk is set as a percentage less than the maximum chunk size established for a collection without a sequential key type. Further, when the chunk within the collection having the sequential key pattern is split, as discussed below, it may be permitted to continue to increase in size up to another threshold, for example, the maximum chunk size established for collections having non sequential keys. Using multiple thresholds can establish a range in which a chunk with a sequential key pattern can grow in size without requiring additional splitting.

In some embodiments, an end-user can enter maximum sizes for both types of collections, and in some examples set a first threshold for chunk size in a collection having a sequential key and a second growth threshold after which a default split operation can be required. Under ideal circumstances a minimal data migration operation can result in a "zero cost" split of a data chunk. In particular, once the chunk size exceeds a size threshold, a maximum key value within the chunk can be readily identified. The chunk of data can be split based on the maximum key value. In some examples, owing to the properties of the sequential key/key pattern, all the data (e.g., records, documents, data entities, data relations, etc.) existing in the chunk have associated key values that are less than the maximum key value. The new chunk is created to contain any data having associated key values greater than the maximum. In essence, the new chunk is empty of data records, but becomes the target for any new data stored, created, and/or moved into the collection. In another example, a chunk without data can be migrated across the servers hosting shards with little or no computational burden. In some embodiments, data migration can be reduced to changes in the meta-date stored on, for example, configuration servers, which can then be propagated to routing processes. In some embodiments, verification processes can still be employed. By modifying splitting operations to result in chunk having no or limited amounts of data, subsequent verification processes are optimized, and require significantly less processing in order to verify data migration has occurred appropriately.

Further, such data migrations can be configured to select shard servers that are the most imbalanced within a shard cluster. For example, whenever an optimized chunk (e.g., a chunk having little or no data) is created, an optimized rebalancing process can be configured to identify a least loaded shard server. The determination of a least loaded shard server can include establishing chunk counts for the shard servers in a given cluster and identifying the shard server with the least number of chunks. According to some embodiments, migrating an optimized chunk to a least loaded server reduces the overall imbalance in a shard cluster. In other embodiments, rebalancing processes (e.g., 500 and 600) can run in conjunction with optimized rebalancing processes. In some alternatives, optimized rebalancing processes include at least some the functions described in 500 and 600 and are modified to prioritize migration of newly created optimized chunks. In some examples, metadata can include information on when a chunk was created, as well as status information identifying an optimized chunk, further metadata information on chunks within a sharded database can include state information reflective of key type, and can include state information identifying chunks within a collection having a sequential key, and in some further examples can include state information identifying if those chunks have been split.

Step 708 can include various sub-processes for optimizing splitting of chunk data and/or optimizing migration of data to other shard servers. Process 700 can also include steps for establishing new chunks on shard servers added to a cluster (not shown). In some embodiments, these processes can be executed as part of 708 and/or instead of step 708.

Figure 8:
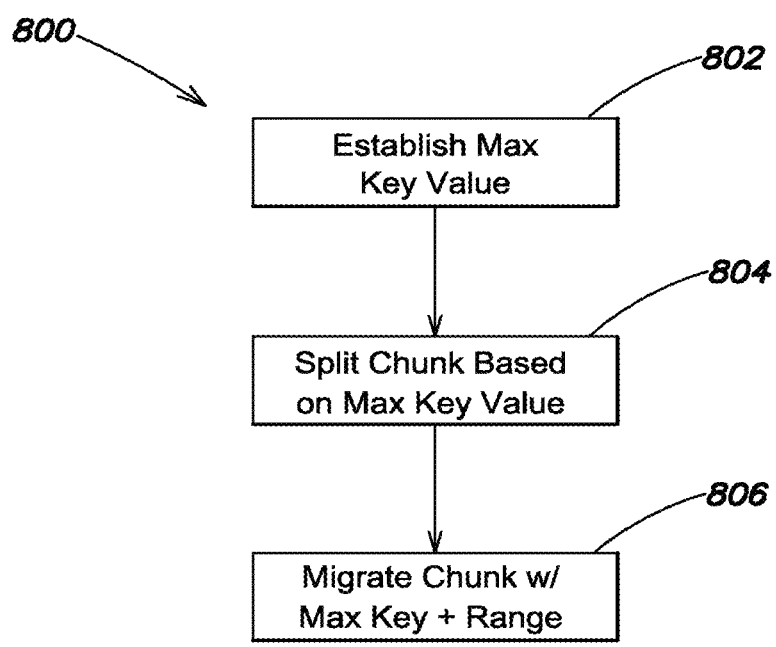
FIG. 8 illustrates an example process for generating an optimized chunk, according to aspects of the invention.

Shown in FIG. 8 is an example process 800 for optimizing the generation of a new chunk of data in a sharded collection. In some embodiments, process 800 can be executed as part of process 700, for example in conjunction with and/or instead of 708. Process 800 begins at 802 with establishing the maximum key value associated with a given chunk of data. Typically, process 800 can be executed after a shard cluster determines that data splitting is required. At 804, a chunk of data can be split based on the maximum key value. According to one embodiment, the original chunk is split such that little or no data needs to be copied to the new chunk. In one example, the original chunk contains all the data within the collection associated with a range of key values. The range is defined to start at a minimum key value and for convenience to include any value greater than the minimum. Maximum values can also be set for such ranges, however, in some embodiments it can be efficient to have the range include any data associated with a key value greater than the minimum key value within the collection. When the data within the chunk exceeds a size threshold, the shard cluster is configured to split the chunk into two partitions. In some embodiments, zero cost splitting can be executed by: 1) leaving the original data in the first partitioned chunk—in essence no data migration or movement is required, simply establishing a maximum key value for the range of data in the first partition; and 2) creating a new chunk having data with a minimum key value greater than the maximum key value for the first partitioned chunk. The new chunk can be referred to as a maximum key range chunk as the data routed to that chunk will be associated with data having key values greater than the current maximum key value determined at 802.

Figure 12:
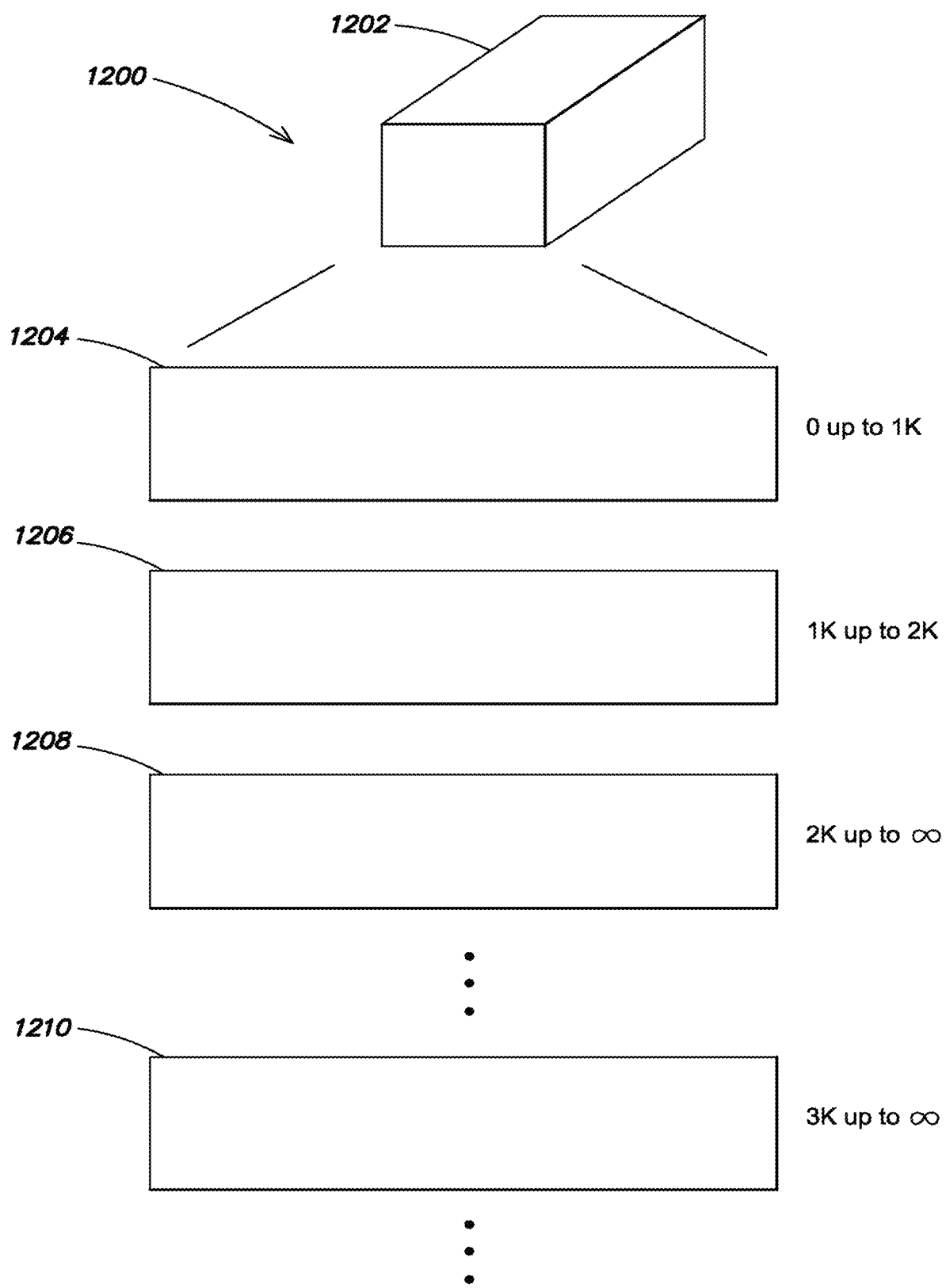
FIG. 12 is a logical diagram of a shard server, according to aspects of the invention.

To provide an example, illustrated in FIG. 12 is a logical diagram 1200 of a shard server hosting database chunks with ranges of key values for a given collection. Shard server 1202 maintains data chunks 1204-1208. Each chunk describes data within the collection associated with its own unique key. In this example, the key pattern for the collection represented by 1204-1208 is sequential. Thus, according to one embodiment, all new data elements that are added receive a key value that is greater than any previously used key value. A simple example of such a key pattern includes a monotonically increasing key value. In some embodiments, other sequences can be used. Compound keys can also be regarded and operated on as sequential keys so long as a portion of the key is sequential.

Chunk 1204 includes data having key ranges from 0 up to 1K. The size of chunk 1204 is controlled by a chunk size threshold. In one example, the chunk size threshold can be established by an end-user in a management interface. In another example, the chunk size can be a default value. Chunk 1206 includes data having key ranges from 1K up to 2K, and its size is also controlled by the chunk size threshold. Chunk 1208 represents the maximum key range chunk with key value from 2K up to ∞. The three dots shown in FIG. 12 reflect the ability to define additional chunks and additional key ranges for those chunks.

As the key assignment occurs sequentially in the given collection, new data will be routed to the maximum key range chunk 1208. Chunk 1208 will grow as new data is added to the collection until the threshold chunk size is exceeded. Shown in dashed line at 1210 is a hypothetical split of chunk 1208. Once chunk 1208 exceeds the chunk size threshold, a new chunk 1210 is created for key range values of 3K up to ∞. During the split process chunk 1208 can be associated with a range of key values having a new maximum key value including the range of values of 2K up to 3K. According to some embodiments, the majority of any growth in the collection will occur at the maximum key range chunk, and consequently the vast majority of splitting will be executed on the maximum key range chunk. In some embodiments, internal chunks (i.e. not the maximum key range chunk) can still be split. For example, modification to existing data can result in internal chunks that exceed a chunk size threshold. Although in some embodiments, internal chunks can be associated with additional chunk size thresholds to permit some growth in internal chunk size without requiring splitting. Internal chunk splitting can be performed, for example, through the execution of processes 300 and/or 400 as described above.

Returning to FIG. 8, new data entries (e.g., inserts, adds, etc.) will be routed to the new chunk by shard cluster routing processes. The metadata governing the routing processes can be updated at the configuration servers and propagated to the routing processes based on the new key value ranges associated with the two partitions. Thus, in an ideal scenario none of the data in the collection needs to be copied to establish the new chunk, rather only metadata changes are required to establish a maximum key value for the key range of the first chunk, and a new range of key values for the second chunk.

According to some embodiments, data requests can continue even during chunk splitting, and reconciliation processing can be required to complete the generation of a new chunk. Reconciliation processing can occur as part of step 804. In some embodiments, data copying can also be required to generate the new chunk and occur as part of step 804. According to one embodiment, sub-processes can be executed as part of step 804, including for example a reconciliation process for resolving database operations received during chunk splitting and/or a verification process to ensure any data copied was copied correctly. Sharding data based on a maximum key value reduces the computational burden associated with chunk generation on any sharded database. Additional benefits can also be derived in some embodiments. Optimizing chunk creation to generate chunks with little or no data provides for significant advantage by reducing the computation burden of migrating the new chunk to another shard server. Further, any network traffic associated with chunk migration of a populated chunk, e.g., as discussed above, includes copying and verification of data which can be reduced to negligible levels by migrating chunks having little or no data. Migration of a maximum key range chunks can in some examples, require only updating of metadata in configuration servers and propagation of the updates to routing processes. In some embodiments, chunk migration to another shard server occurs as part of process 800 at 806. In some embodiments, data migration is optional and step 806 need not be performed in all executions of process 800.

In some embodiments, migration of chunks can occur as part of process 800. In other embodiments, chunk migration can occur as part of separate rebalancing operations (e.g. as part of processes 500 and/or 600). In some settings, migration of a chunk of data having a sequential key can be optimized as discussed herein, for example, as part of processes 700 and/or 800.

The various processes described herein can be configured to be executed on the systems shown by way of example in FIGS. 1-2 and FIG. 12. The systems and/or system components shown can be programmed to execute the processes and/or functions described. Although a shard can be associated with one or more chunks of data, a shard can be associated with one chunk, and any operations disclosed for data chunks can be performed on shards. Some references to shard are intended to include the partitioned data associated with a shard and the data management processes used to access and/or modify the data. Various operations disclosed for splitting, migrating, rebalancing, chunks can be executed in conjunction with the instantiation of additional database instances that are then associated with new data chunks forming new database shards.

Additionally, other computer systems can be configured to perform the operations and/or functions described herein. For example, various embodiments according to the present invention may be implemented on one or more computer systems. These computer systems may be, specially configured, general-purpose computers such as those based on Intel Atom, Core, or PENTIUM-type processor, IBM PowerPC, AMD Athlon or Opteron, Sun UltraSPARC, or any other type of processor. It should be appreciated that one or more of any type computer system may be used to host a database partition, host a database shard, host a database chunk, or execute the processes discussed above for migrating data partitions, splitting data partitions, verifying data migration, verifying data splitting, maintaining partition versions, routing database requests, balancing data distribution, balancing distribution of partitions, balancing distribution of chunks, determining a state of the database based on data distribution, determining a partition count for each server hosting a partition, identifying a least loaded server, identifying an most loaded server, maintain metadata for a partitioned database, maintaining metadata for a shard cluster, updating metadata, replicating metadata to routing processes, routing database operations, and reconciling database operations on migrated and/or split partitions. Further, the computer systems can be configured to provide for replication of the data within the data partitions by implementing each server hosting one or more partitions as a replica set, insuring automatic failover for each server hosting one or more partitions. Additionally, any system may be located on a single computer or may be distributed among a plurality of computers attached by a communications network.

A general-purpose computer system can be specially configured as disclosed herein. According to one embodiment of the invention the general-purpose computer system is configured to perform any of the described operations and/or algorithms, including but not limited to monitoring partition size throughout the database, splitting database partitions in response to exceeding size thresholds, migrating database partitions between servers, verifying migrations of partitions, reconciling database operations for migrated partitions, rebalancing partition distribution, determining an unbalanced state exists, identifying most loaded and/or least loaded servers, analyzing collections for database key type, analyzing collections for database pattern type, optimizing migration operations for collections with sequential keys (patterns and/or key), optimizing splitting operations for collections with sequential keys (patterns and/or key), identifying maximum key values in a collection, splitting database partitions based on maximum key value, generating maximum key range partitions, etc. The operations and/or algorithms described herein can also be encoded as software executing on hardware that define a processing component, that can define portions of a general-purpose computer, reside on an individual general-purpose computer, and/or reside on multiple general-purpose computers.

Figure 9:
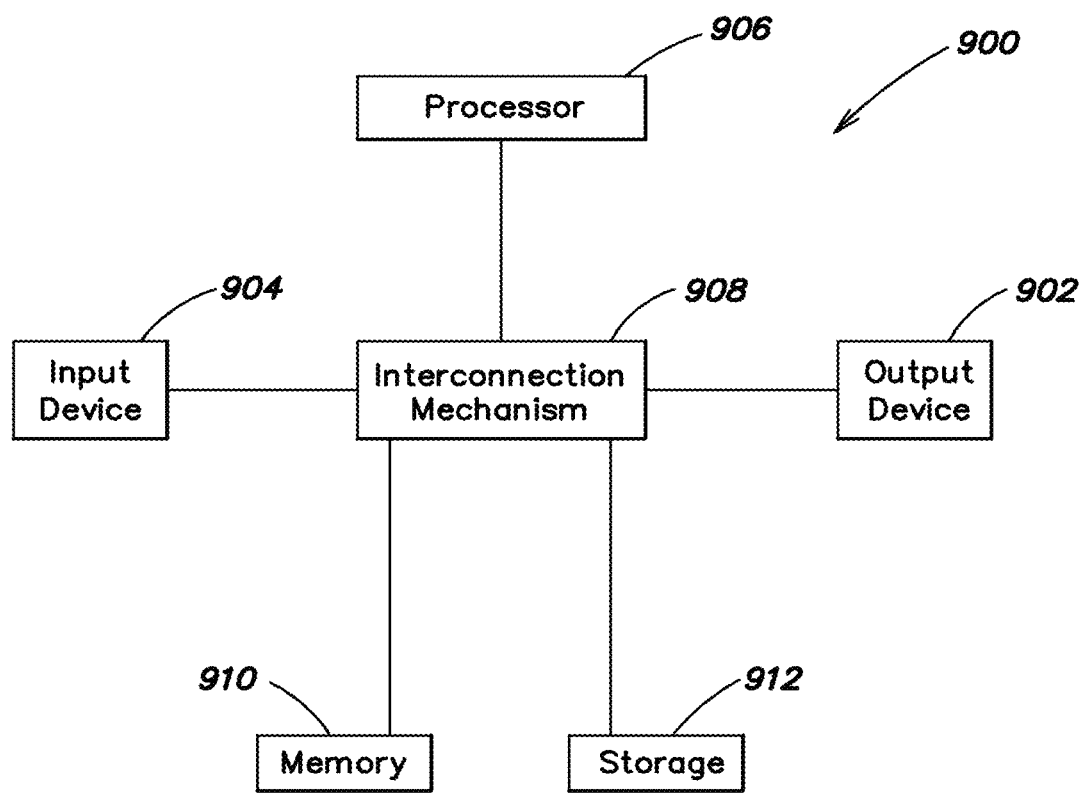
FIG. 9 is a block diagram of an example distributed database system in which various aspects of the present invention can be practiced.

FIG. 9 shows a block diagram of an example general-purpose computer system 900 on which various aspects of the present invention can be practiced. For example, various aspects of the invention can be implemented as specialized software executing in one or more computer systems including general-purpose computer systems 1104, 1106, and 1108 communicating over network 1102 shown in FIG. 11. Computer system 900 may include a processor 906 connected to one or more memory devices 910, such as a disk drive, memory, or other device for storing data. Memory 910 is typically used for storing programs and data during operation of the computer system 900. Components of computer system 900 can be coupled by an interconnection mechanism 908, which may include one or more busses (e.g., between components that are integrated within a same machine) and/or a network (e.g., between components that reside on separate discrete machines). The interconnection mechanism enables communications (e.g., data, instructions) to be exchanged between system components of system 900.

Computer system 900 may also include one or more input/output (I/O) devices 902-904, for example, a keyboard, mouse, trackball, microphone, touch screen, a printing device, display screen, speaker, etc. Storage 912, typically includes a computer readable and writeable nonvolatile recording medium in which computer executable instructions are stored that define a program to be executed by the processor or information stored on or in the medium to be processed by the program.

Figure 10:
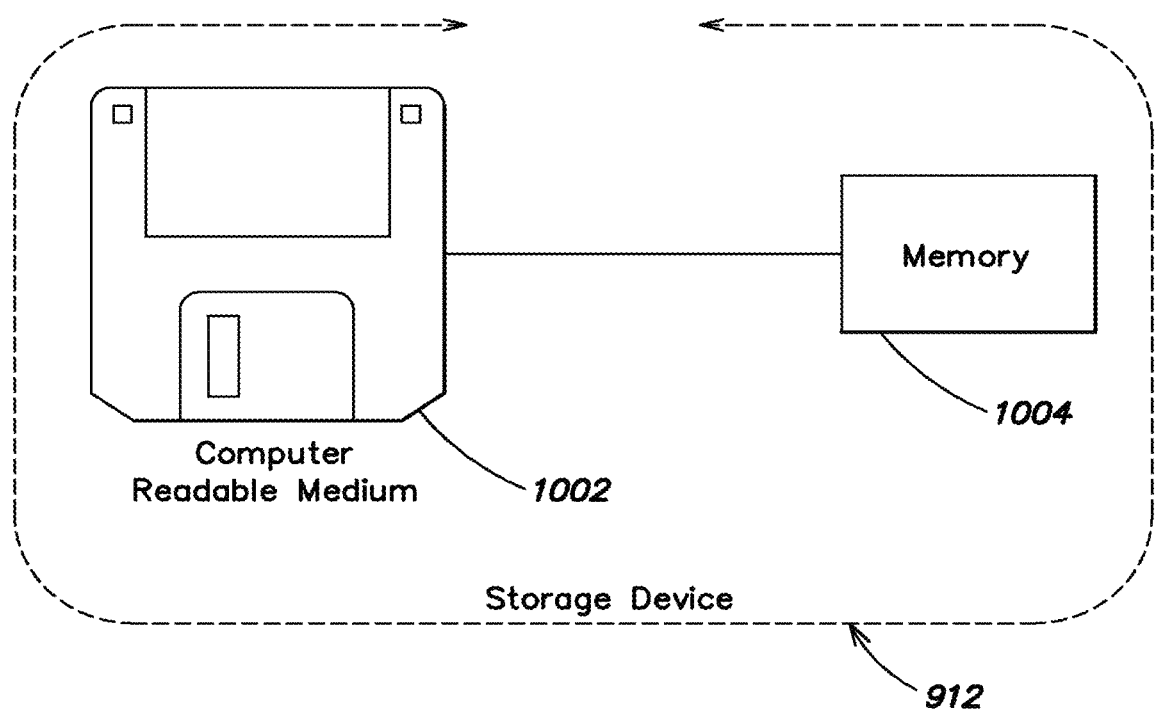
FIG. 10 is a block diagram of an example distributed database system in which various aspects of the present invention can be practiced.

The medium can, for example, be a disk 1002 or flash memory as shown in FIG. 10. Typically, in operation, the processor causes data to be read from the nonvolatile recording medium into another memory 1004 that allows for faster access to the information by the processor than does the medium. This memory is typically a volatile, random access memory such as a dynamic random access memory (DRAM) or static memory (SRAM). According to one embodiment, the computer-readable medium comprises a non-transient storage medium on which computer executable instructions are retained.

Referring again to FIG. 9, the memory can be located in storage 912 as shown, or in memory system 910. The processor 906 generally manipulates the data within the memory 910, and then copies the data to the medium associated with storage 912 after processing is completed. A variety of mechanisms are known for managing data movement between the medium and integrated circuit memory element and the invention is not limited thereto. The invention is not limited to a particular memory system or storage system.

The computer system may include specially-programmed, special-purpose hardware, for example, an application-specific integrated circuit (ASIC). Aspects of the invention can be implemented in software, hardware or firmware, or any combination thereof. Although computer system 900 is shown by way of example, as one type of computer system upon which various aspects of the invention can be practiced, it should be appreciated that aspects of the invention are not limited to being implemented on the computer system as shown in FIG. 9. Various aspects of the invention can be practiced on one or more computers having a different architectures or components than that shown in FIG. 9.

It should be appreciated that the invention is not limited to executing on any particular system or group of systems. Also, it should be appreciated that the invention is not limited to any particular distributed architecture, network, or communication protocol.

Various embodiments of the invention can be programmed using an object-oriented programming language, such as Java, C++, Ada, or C # (C-Sharp). Other object-oriented programming languages may also be used. Alternatively, functional, scripting, and/or logical programming languages can be used. Various aspects of the invention can be implemented in a non-programmed environment (e.g., documents created in HTML, XML or other format that, when viewed in a window of a browser program, render aspects of a graphical-user interface (GUI) or perform other functions). The system libraries of the programming languages are incorporated herein by reference. Various aspects of the invention can be implemented as programmed or non-programmed elements, or any combination thereof.

Various aspects of this invention can be implemented by one or more systems similar to system 900. For instance, the system can be a distributed system (e.g., client server, multi-tier system) comprising multiple general-purpose computer systems. In one example, the system includes software processes executing on a system associated with hosting database services, processing operations received from client computer systems, interfacing with APIs, receiving and processing client database requests, routing database requests, routing targeted database request, routing global database requests, determining global a request is necessary, determining a targeted request is possible, verifying database operations, managing data distribution, replicating database data, migrating database data, etc. These systems can also permit client systems to request database operations transparently, with various routing processes handling and processing requests for data as a single interface, the routing processes can manage data retrieval from database partitions, merge responses, and return results as appropriate to the client, among other operations.

There can be other computer systems that perform functions such as hosting replicas of database data, each server hosting database partitions can be implemented as a replica set, among other functions. These systems can be distributed among a communication system such as the Internet. One such distributed network, as discussed below with respect to FIG. 11, can be used to implement various aspects of the invention. Various replication protocols can be implemented, and in some embodiments, different replication protocols can be implemented, with the data stored in the database replication under one model, e.g., asynchronous replication of a replica set, with metadata servers controlling updating and replication of database metadata under a stricter consistency model, e.g., requiring dual phase commit operations for updates.

Figure 11:
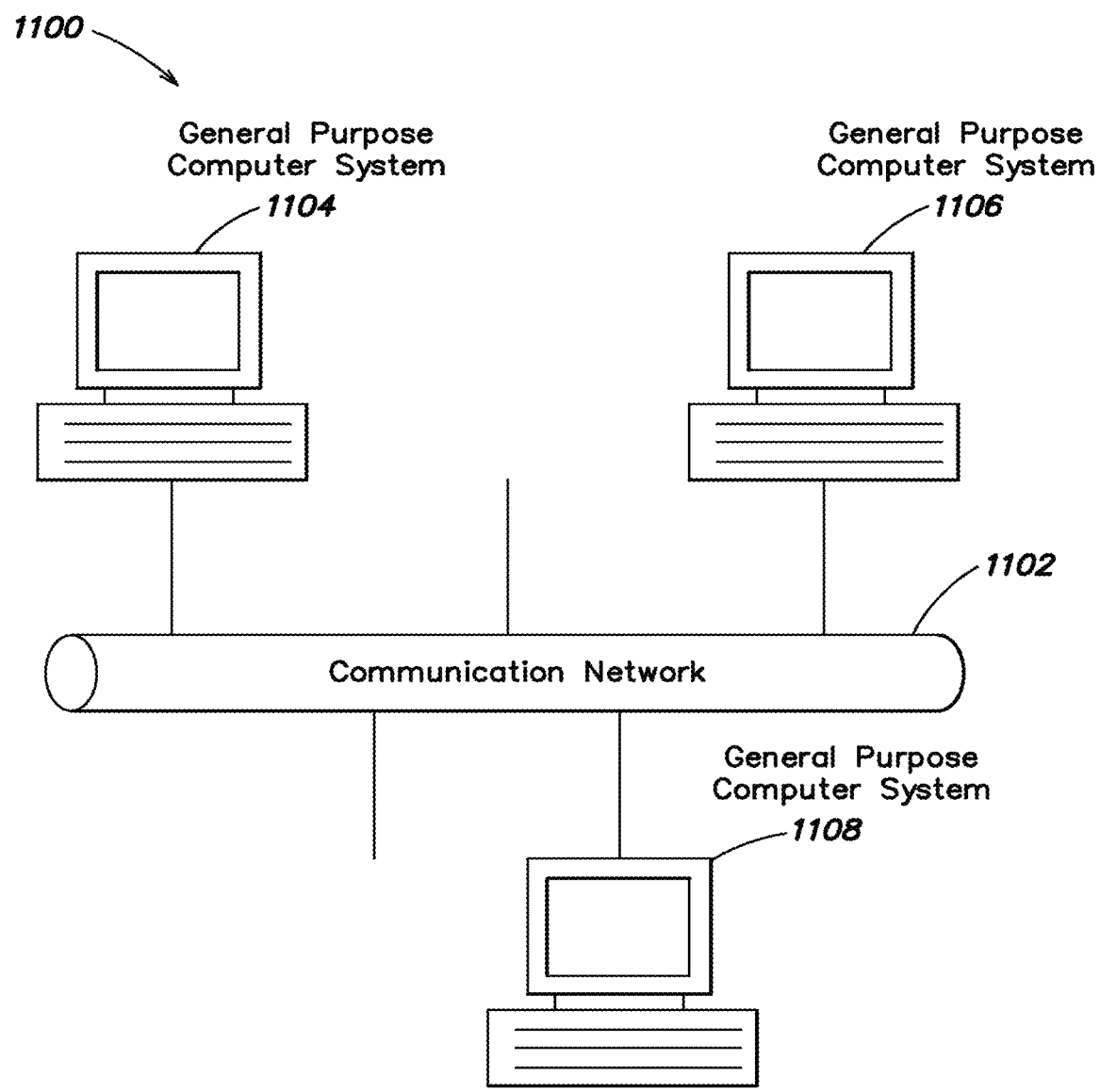
FIG. 11 is a block diagram of an example distributed database system in which various aspects of the present invention can be practiced.

FIG. 11 shows an architecture diagram of an example distributed system 1100 suitable for implementing various aspects of the invention. It should be appreciated that FIG. 11 is used for illustration purposes only, and that other architectures can be used to facilitate one or more aspects of the invention.

System 1100 may include one or more specially configured general-purpose computer systems distributed among a network 1102 such as, for example, the Internet. Such systems may cooperate to perform functions related to hosting a partitioned database, managing database metadata, monitoring distribution of database partitions, monitoring size of partitions, splitting partitions as necessary, migrating partitions as necessary, identifying sequentially keyed collections, optimizing migration, splitting, and rebalancing for collections with sequential keying architectures.

In an example of one such system, one or more computer systems 1104, 1106, and 1108 are configured to be nodes in a shard cluster. The shard cluster set is configured to response to client requests for database access. In one setting, access to the database occurs through various APIs and associated drivers. It should be understood that the one or more computer systems 1104, 1106, and 1108 can also be used to execute routing processes, monitoring processes, rebalancing operations, determining distributions database data, etc. In one example, client computer systems can interface with computer systems 1104-1108 via an Internet-based interface.

In another example, a system 1104 can be accessed through a browser program such as the Microsoft Internet Explorer application program, Mozilla's FireFox, or Google's Chrome browser through which one or more websites can be accessed. Further, there can be one or more application programs that are executed on system 1104 that perform functions associated with responding to client interactions. For example, system 1104 may include one or more local databases that are not replicated for storing local configuration and state information on a given node. Local state information can be used to determine eligibility for responding to client requests, hosting metadata copies, as examples.

Network 1102 may also include, as part of a system for optimizing data distribution, one or more server systems, which can be implemented on general-purpose computers that cooperate to perform various functions discussed herein, including migrating database partitions across servers in a shard cluster, reconciling database operations during and/or after migrations, identifying maximum key values in a collection, splitting partitions based on the maximum key value, etc. System 1100 may execute any number of software programs or processes on various hardware and the invention is not limited to any particular type or number of processes. Such processes can perform the various workflows associated with a system for asynchronously replicating distributed database operations.

Certain implementations of a managed database, a shard cluster, and/or a partitioned database can employ any number of the following elements, with each of the elements configured to perform the listed functions individually, collectively, and/or in various combination, with each indent representing a refinement of an element that can also be used individually, collectively, and/or in various combination:

Shard Server configured to host one or more database partitions
    Further configured to receive and respond to database requests Configuration Server configured to manage metadata associated with the partitioned database
    Further configured to distribute metadata to routing processes
    Further configured to update metadata via highly consistent operation
        Wherein highly consistent operation includes two phased commit updates
    Further configured to control versioning of the plurality of partitions
    Further configured to assign version numbers to the split partitions
    Further configured to verify split occurred properly
    Further configured to verify migration occurred properly
    Further configured to assign version in response to verification Routing process configured to received database request as a single interface and direct requests either to targeted shards or globally
    Further configured to determined if target or global request is required based on the received data request Balancing process configured to redistribute database partitions across any shard servers in the database
    Further configured to monitor distribution of data across the partitioned database
    Further configured to monitor distribution of data based on partition counts for each server hosting database partitions
    Further configured to redistribute partitions from most loaded to least loaded servers
    Further configured to rebalance partitions until difference between most and least <=2

Database partitions defined by ranges of database keys and/or key patterns
    Wherein the partitions are "chunks" of data
    Wherein the partitions are "shards" of data
        Wherein the shard of data is a chunk of data Replica Sets configured to provide automatic failover functionality
    Wherein a database server hosting a database partition, chunk, and/or cluster can be implemented as a replica set Partition component configured to detect a partition size that exceeds a size threshold, split the partition into at least a first and a second partition and control a distribution of data within the first and the second partition based on a value for a database key associated with the data in the partition, wherein controlling the distribution includes minimizing any data distributed to the second partition based on a maximum value for the database key associated with the data in the partition.
    Further configured to identify a collection comprising a group of database partitions having a sequential database key wherein controlling the distribution of data occurs in response to an identification of the sequential database key
    Further configured to define the first partition having a minimum key value and a maximum key value less than or equal to the maximum key value for the partition's data, define the second partition range to include values greater than or equal to the maximum key value Migration component configured to migrate partitions between servers hosting database partitions
    Further configured to migrate partitions responsive to partition splitting
    Further configured to determine a distribution of the plurality of partitions across the plurality of servers, in response to splitting
    Further configured to migrate a partition to a least loaded server
    Further configured to deny write operations to data within the partition.

Reconciliation component configured to log database operations received on partitions during at least one of a migration operation and a splitting operation
    Further configured to update at least one partition in response to the completion of a respective migration and splitting operation Additionally, the operations and/or functions identified with respective components are not intended to be mutually exclusive. The operations and/or functions disclose with respect to one component can be executed by other disclosed components, either by configuring a component to perform the operation directly or by incorporating various components into other components.

Certain implementations of a managed database, a shard cluster, and/or a partitioned database can be configured to respond to client data requests as if a single database were responding to the requests. According to some embodiments, operations can be resolved by a routing to process to target specific partitions and/or the servers hosting the partitions with the necessary data. Additional global operations can be run against all the partitions where specific partitions cannot be targeted. In one implementation, operations on a sharded system can be configured to fall into one of two categories: global and targeted.

For targeted operations, routing processes communicate with a very small number of shards, in some examples a single shard to return responsive data. Global operations involve the routing process reaching out to all (or most) shards in the system. The following table shows various operations and their type for an example implementation of a partitioned database system. The table assumes a shard key of for the queried collection of {x: 1}. Requests can be targeted based on the received request having a queried property in common with the key used to organize the collection. In some embodiments, routing processes can also resolve internal indexes in the collection to target specific requests to specific partitions and/or shard servers.

| Operation | Type |
| --- | --- |
| db.find.( { x: 300 } ) | Targeted |
| db.foo.find( { x: 300, age : 40 } ) | Targeted |
| db.foo.find( { age : 40 } ) | Global |
| db.foo.find( ) | Global |
| db.foo.find(...).count( ) | Variable |
| db.foo.find(...).sort( { age : 1 } ) | Global |

-continued

| Operation | Type |
| --- | --- |
| db.foo.find(...).sort( { x : 1 } ) | Global |
| db.foo.count( ) | Global |
| db.foo.insert( <object> ) | Targeted |
| db.foo.update( { x : 100 }, <object> ) | Targeted |
| db.foo.remove( { x : 100 } ) | |
| db.foo.update( { age : 40 }, <object> ) | Global |
| db.foo.remove( { age : 40 } ) | |
| db.foo.ensureIndex(...) | Global |

Having thus described several aspects and embodiments of this invention, it is to be appreciated that various alterations, modifications and improvements will readily occur to those skilled in the art. Such alterations, modifications, and improvements are intended to be part of this disclosure, and are intended to be within the spirit and scope of the invention. Accordingly, the foregoing description is by way of example only.

Use of ordinal terms such as "first," "second," "third," "a," "b," "c," etc., in the claims to modify or otherwise identify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

What is claimed is:

1. A system for optimizing data distribution, the system comprising:
   at least one processor operatively connected to a memory for executing system components;
   a database comprising a plurality of database partitions for storing database data, wherein at least one of the plurality of database partitions includes a contiguous range of data from the database; and
   a partition component configured to:
      detect a partition size for at least one of the plurality of database partitions that exceeds a size threshold;
      split the database partition that exceeds a storage size threshold into at least a first and a second partition;
      control, during splitting, a distribution of original data stored in the at least one of the plurality of database partitions that exceed the size threshold to the first and the second partition, wherein controlling the distribution includes minimizing any data distributed to the second partition and maximizing data distributed to the first partition, and
   wherein the partition component is further configured to identify database partitions having an increasing database key or portion of a database key.

2. The system according to claim 1, wherein the partition component is further configured to:
   assign at least any data in the at least one of the plurality of database partitions having associated database key values less than the maximum value to the first partition; and
   assign at least any data in the at least one of the plurality of database partitions having database key values greater that the maximum value to the second partition.

3. The system according to claim 1, wherein the partition component is configured to use default splitting operations rather than minimizing any data distributed to the second partition and maximizing data distributed to the first partition, where keys or key patterns are not increasing.

4. The system according to claim 1, further comprising a migration component configured to migrate database partitions between a plurality of servers configured to host the database partitions.

5. The system according to claim 1, further comprising a rebalancing component configured to determine a state of the database based on a distribution of the plurality of partitions across the plurality of servers, wherein the rebalancing component is further configured to migrate at least one partition in response to the state indicating an imbalanced distribution of partitions.

6. The system according to claim 1, further comprising a routing component configured to route database requests to identified partitions, wherein the routing component is further configured to identify partitions based, at least, on key values or key patterns associated with the data requests.

7. The system according to claim 3, further comprising a configuration component configured to manage metadata information associated with each of the plurality of partitions, the metadata information including a defined range of key values or key patterns associated with each partition.

8. The system according to claim 7, wherein the configuration component is further configured to replicate the metadata across any routing component of the system.

9. The system according to claim 8, wherein the configuration component is further configured to update the metadata information in response to the partition component splitting the at least one of the plurality of database partitions into at least the first and the second partition.

10. The system according to claim 3, further comprising a reconciliation component configured to log database operations received on partitions during at least one of a migration operation and a splitting operation, wherein the reconciliation component is further configured to update at least one partition in response to the completion of a respective migration and splitting operation.

11. A computer implemented method for optimizing data distribution, the method comprising acts of:
   monitoring, by a computer system, a distributed database including a plurality of database partitions for storing database data, wherein at least one of the plurality of database partitions includes a contiguous range of data from the database;
   detecting, by the computer system, a partition size of the at least one of the plurality of database partitions exceeds a size threshold;
   splitting, by the computer system, the at least one of the plurality of database partitions that exceeds a storage size into at least a first and a second partition;
   identifying an increasing database key or key pattern;
   responsive to the identification of the increasing database key or key pattern, controlling, by the computer system, a distribution of original data stored in the at least one of the plurality of database partitions that exceed the size threshold within the first and the second partition based on a value for a database key associated with the data in the at least one of the plurality of database partitions, wherein controlling the distribution includes minimizing any data distributed to the second partition and maximizing data distributed to the first partition.

12. The method according to claim 11, wherein the act of minimizing any data distributed to the second partition includes acts of:

assigning at least any data in the at least one of the plurality of database partitions having database key values less than the maximum value to the first partition; and assigning at least any data in the at least one of the plurality of database partitions having database key values greater that the maximum value to the second partition.

13. The method according to claim 12, wherein the method further comprises hosting the distributed database on a plurality of servers, wherein the act of hosting the distributed database includes hosting the plurality of database partitions on the plurality of servers.

14. The method according to claim 12, further comprising an act of migrating database partitions between the plurality of servers.

15. The method according to claim 12, further comprising an act of routing database requests to identified partitions, wherein the act of routing includes identifying partitions based, at least, on key values or key patterns associated with the data request.

16. The method according to claim 12, further comprising an act of managing metadata information associated with each of the plurality of partitions, wherein the metadata information includes a defined range of key values or key patterns associated with the data contained in each partition.

17. The method according to claim 16, further comprising an act of updating the metadata information in response to splitting the at least one of the plurality of database partitions into at least the first and the second partition.

18. The method according to claim 12, further comprising acts of:

logging database operations received during at least one of a migration operation and a splitting operation;

reconciling at least one partition after completing the at least one of the migration operation and the splitting operation, wherein the act of reconciling includes an act of executing the logged database operations.

19. A computer-readable storage medium having computer-readable instructions that, as a result of being executed by a computer, instruct the computer to perform a method for optimizing data distribution, the method comprising acts of:

monitoring a distributed database including a plurality of database partitions for storing database data, wherein at least one of the plurality of database partitions includes a contiguous range of data from the database;

detecting a partition size of the at least one of the plurality of database partitions exceeds a size threshold;

splitting the at least one of the plurality of database partitions into at least a first and a second partition;

controlling a distribution of data within the first and the second partition, wherein controlling the distribution includes minimizing any data distributed to the second partition and maximizing data distributed to the first partition, and wherein the partition component is further configured to identify database partitions having an increasing database key or portion of a database key.

* * * * *